United States Patent
Mukherjee et al.

(10) Patent No.: US 11,747,882 B2
(45) Date of Patent: Sep. 5, 2023

(54) CENTRAL PROCESSOR/ACCELERATOR POWER MANAGEMENT SYSTEM

(71) Applicant: Dell Products L.P., Round Rock, TX (US)

(72) Inventors: Rishi Mukherjee, Bangalore (IN); Ravishankar Kanakapura Nanjundaswamy, Bangalore (IN); Prasoon Sinha, Bangalore (IN); Raveendra Babu Madala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 17/510,726

(22) Filed: Oct. 26, 2021

(65) Prior Publication Data

US 2023/0126109 A1    Apr. 27, 2023

(51) Int. Cl.
*G06F 1/3234* (2019.01)
*G06F 9/50* (2006.01)
*G06F 1/3203* (2019.01)
*G06F 1/3206* (2019.01)

(52) U.S. Cl.
CPC ............ *G06F 1/3234* (2013.01); *G06F 9/505* (2013.01); *G06F 9/5027* (2013.01); *G06F 1/3203* (2013.01); *G06F 1/3206* (2013.01); *G06F 9/50* (2013.01); *G06F 2212/1028* (2013.01)

(58) Field of Classification Search
CPC ........ G06F 1/3203; G06F 1/3206; G06F 9/50; G06F 9/505; G06F 1/3234; G06F 11/3409; G06F 9/5027; G06F 2212/1028
USPC ................... 713/300, 320; 718/104; 702/182
See application file for complete search history.

(56) References Cited

U.S. PATENT DOCUMENTS

| | | | |
|---|---|---|---|
| 9,274,574 B2 | 3/2016 | Conroy et al. | |
| 2012/0324248 A1* | 12/2012 | Schluessler | G06F 1/329 713/300 |
| 2019/0041969 A1* | 2/2019 | Nge | G06F 9/4893 |
| 2021/0041937 A1* | 2/2021 | Zhang | G06F 1/3228 |
| 2021/0157383 A1* | 5/2021 | Hsu | G06F 1/3287 |
| 2021/0223848 A1* | 7/2021 | Rao | G06F 1/3243 |
| 2022/0317747 A1* | 10/2022 | Choi | G06F 1/324 |

* cited by examiner

*Primary Examiner* — Ji H Bae
(74) *Attorney, Agent, or Firm* — Joseph Mencher

(57) ABSTRACT

A networked system includes a computing device having a central processing system and accelerator system(s). A central processor/accelerator power management system coupled to the computing device via a network operates to deploy workload(s) on the computing device and receive workload performance information from the computing device that identifies a central processing system utilization of the central processing system in performing the workload(s) and an accelerator system utilization of each accelerator system in performing the workload(s). Based on the workload performance information, the computing device determines a first power consumption ratio of the central processing system and the accelerator system(s) in performing the workload(s), and modifies operation of at least one of the central processing system and the accelerator system(s) to change the first power consumption ratio to a second power consumption ratio that is more power efficient than the first power consumption ratio.

20 Claims, 19 Drawing Sheets

CENTRAL PROCESSOR/ACCELERATOR POWER MANAGEMENT SYSTEM

BACKGROUND

The present disclosure relates generally to information handling systems, and more particularly to managing power utilized by a central processing subsystem and accelerator subsystem(s) in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are often included in datacenters that generally have limitations on power (and associated cooling capacity) that is available to support datacenter equipment. However, in many situations power capacity available in the datacenter is left unused in order to prevent unexpected peaks in server device utilization that can trip a circuit breaker in the datacenter or otherwise cause a power unavailability in the datacenter. Such issues may be solved by providing a power cap on server devices that prevents the server devices from consuming more than a designated amount of power capacity of the datacenter, and as protections are provided for circuits in the datacenter, network administrators may avoid allocating power capacity of the datacenter unnecessarily, and may otherwise utilized that power capacity more efficiently.

However, many server devices are now implementing central processor/accelerator heterogeneous architectures for high performance computing applications due to their capabilities in providing relatively high levels of computational throughput. For example, server devices may include a Central Processing Unit (CPU) and a Graphics Processing Unit (GPU)/accelerator in a CPU/GPU heterogeneous architecture for high performance computing applications due to the power efficiency advantages that result from the capabilities of the GPU/accelerator to convert power to computational processing throughput relative to CPU-only architectures. However, due to this power efficiency advantage, conventional improvements to CPU/GPU heterogeneous architectures in server devices focus mainly on performance rather than improving power efficiency, and the inventors of the present disclosure have discovered that such CPU/GPU heterogeneous architectures consume power inefficiently in many situations.

Accordingly, it would be desirable to provide a central processor/accelerator power management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a central processor/accelerator power management engine that is configured to: deploy at least one workload on a computing device; receive, from the computing device, workload performance information that identifies a central processing system utilization of a central processing system in the computing device that is performing the at least one workload and an accelerator system utilization of each at least one accelerator system in the computing device that is performing the at least one workload; determine, based on the workload performance information, a first power consumption ratio of the central processing system and the at least one accelerator system in performing the at least one workload; and modify operation of at least one of the central processing system and the at least one accelerator system to change the first power consumption ratio to a second power consumption ratio that is more power efficient than the first power consumption ratio.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
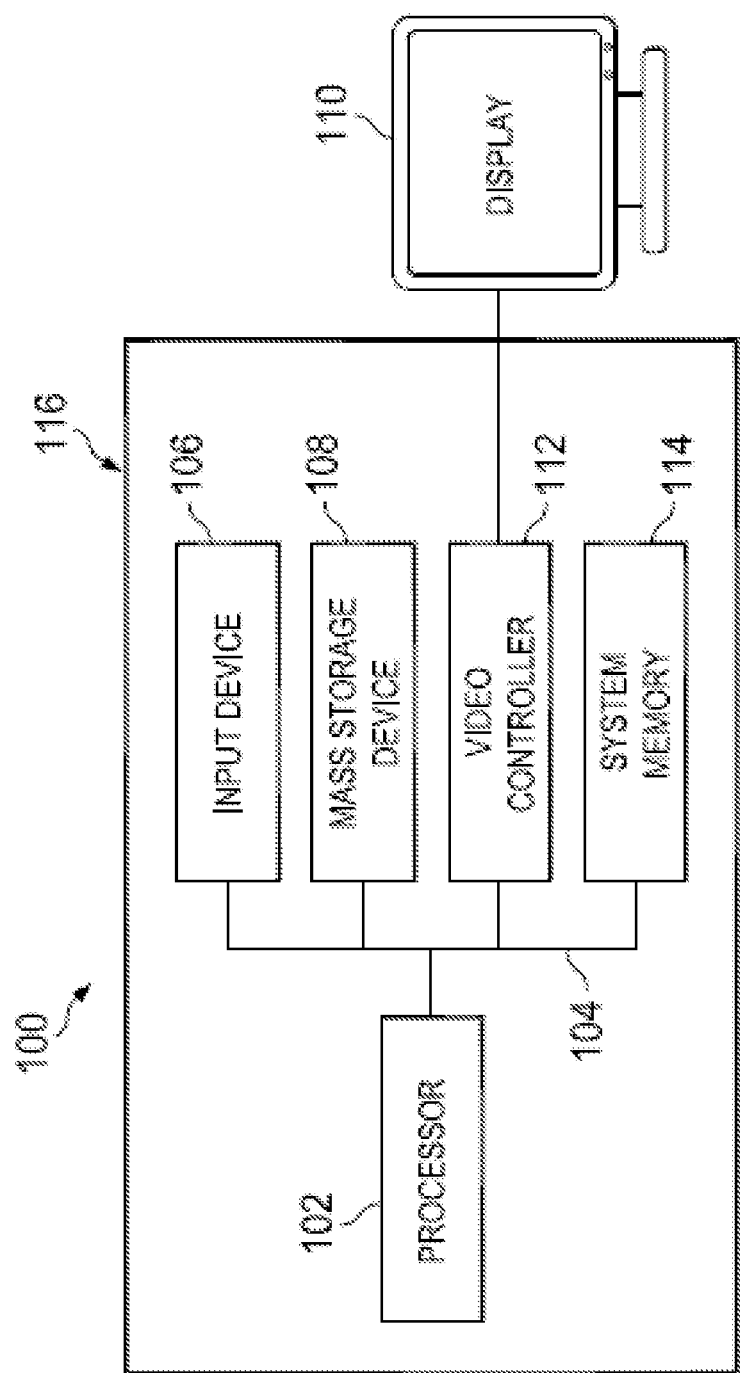
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
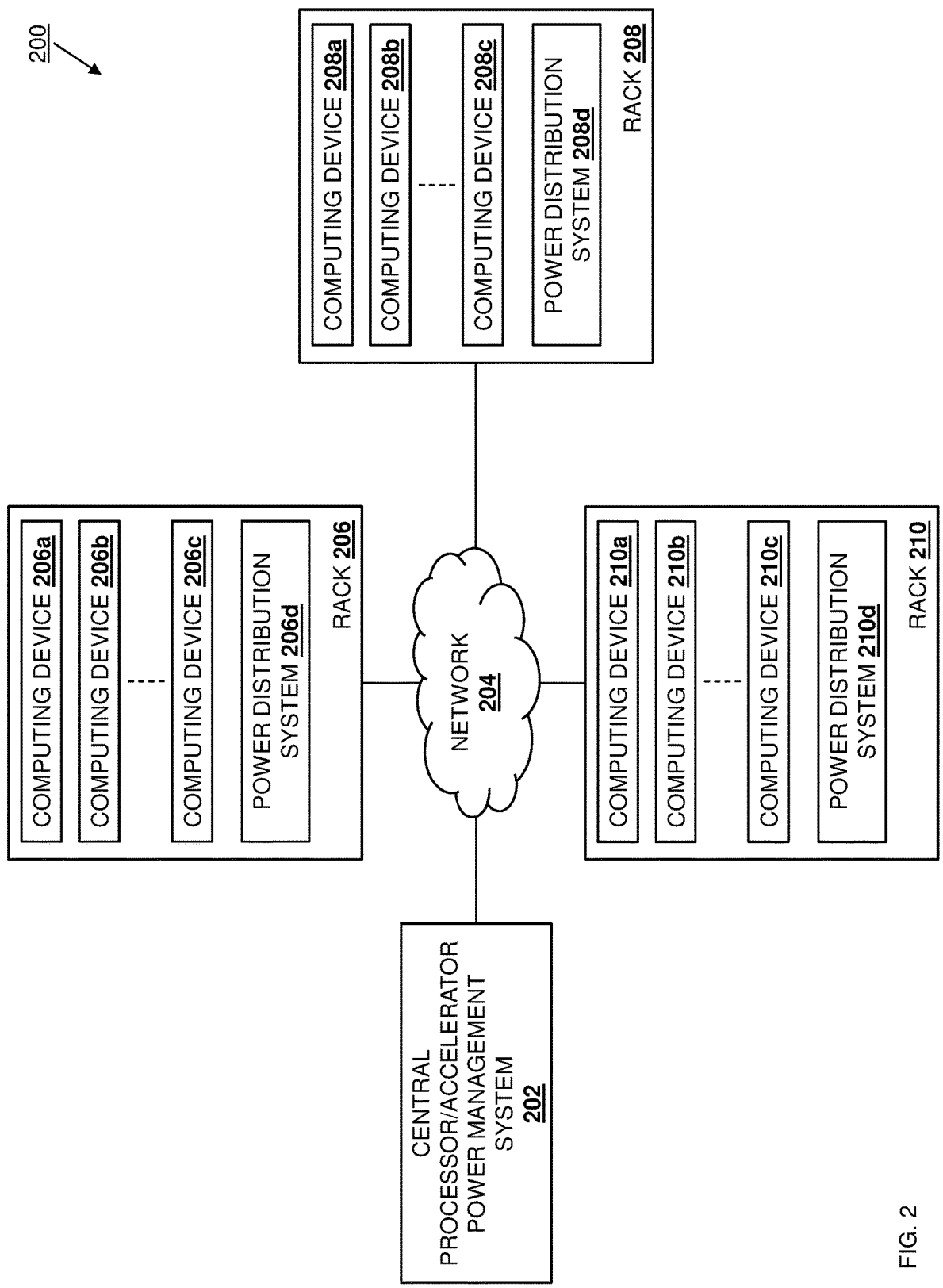
FIG. 2 is a schematic view illustrating an embodiment of a networked system that may include the central processor/accelerator power management system of the present disclosure.

Referring now to FIG. 2, an embodiment of a networked system 200 is illustrated. In the illustrated embodiment, the networked system 200 includes a central processor/accelerator power management system 202. In an embodiment, the central processor/accelerator power management system 202 may be provided by the IHS 100 discussed above with reference to FIG. 1, and/or may include some or all of the components of the IHS 100, and in specific examples may be provided by one or more server devices. However, while illustrated and discussed as being provided by one or more server devices, one of skill in the art in possession of the present disclosure will recognize that the central processor/accelerator power management system provided in the networked system 200 may include any devices that may be configured to operate similarly as the central processor/accelerator power management system 202 discussed below. In the illustrated embodiment, the central processor/accelerator power management system 202 is coupled to a network 204 that may be provided by a Local Area Network (LAN), the Internet, combinations thereof, and/or any other network that would be apparent to one of skill in the art in possession of the present disclosure.

The networked system 200 may also have a plurality of racks including computing devices and power distribution systems that are coupled to the central processor/accelerator power management system 202 via the network 204, with the illustrated embodiment includes a rack 206 housing computing devices 206a, 206b, and up to 206c, along with a power distribution system 206d (e.g., an Uninterruptible Power Supply (UPS), Power Distribution Unit (PDU), etc.), any or all of which may be coupled to the network 204; a rack 208 housing computing devices 208a, 208b, and up to 208c, along with a power distribution system 208d (e.g., a UPS, PDU, etc.), any or all of which may be coupled to the network 204, and a rack 210 housing computing devices 210a, 210b, and up to 210c, along with a power distribution system 210d (e.g., a UPS, PDU, etc.), any or all of which may be coupled to the network 204. However, while a specific networked system 200 has been illustrated and described, one of skill in the art in possession of the present disclosure will recognize that the central processor/accelerator power management system of the present disclosure may include and/or be provided with a variety of components and in a variety of component configurations while remaining within the scope of the present disclosure as well.

Figure 3:
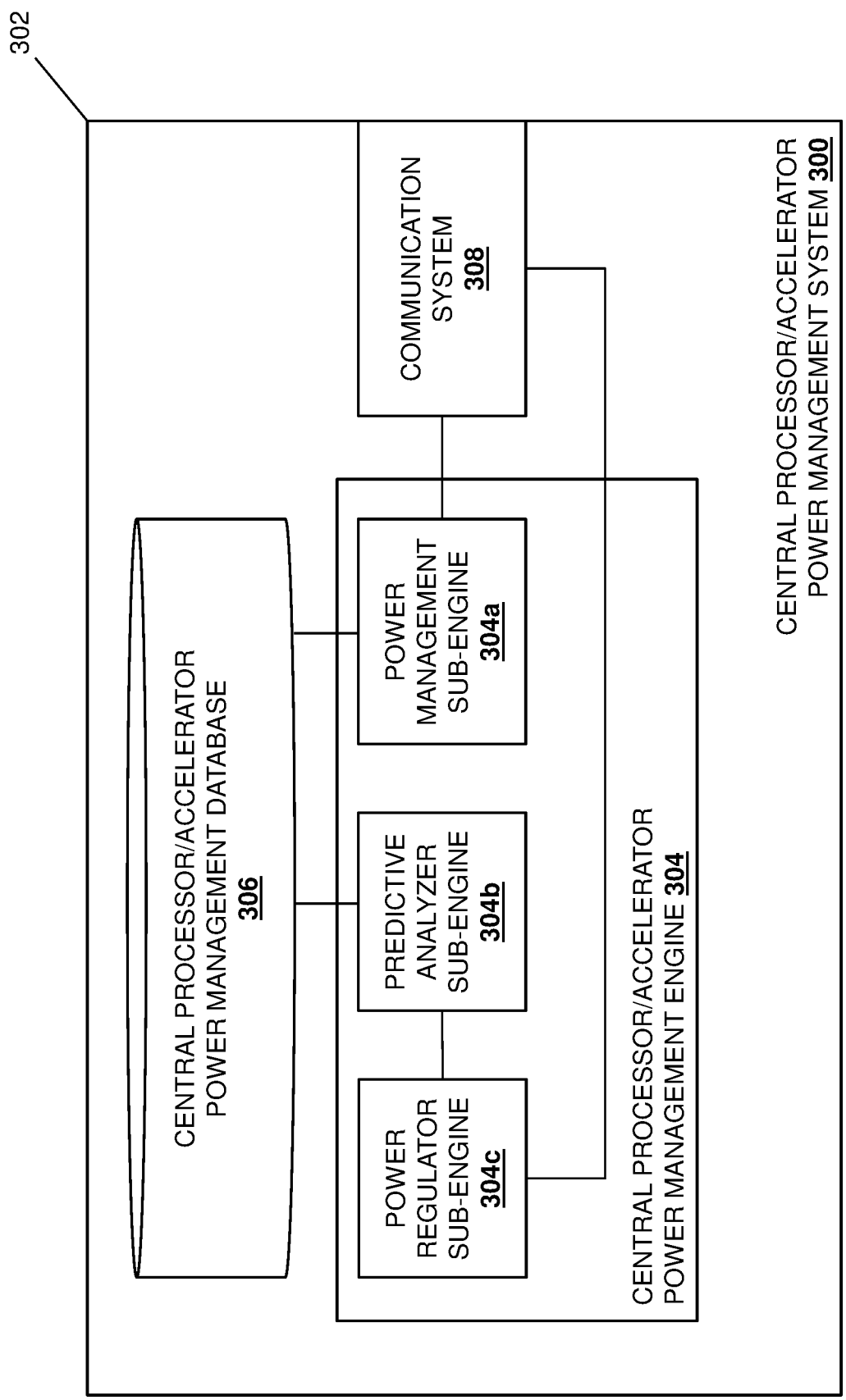
FIG. 3 is a schematic view illustrating an embodiment of a central processor/accelerator power management system that may be included in the networked system of FIG. 2.

Referring now to FIG. 3, an embodiment of a central processor/accelerator power management system 300 is illustrated that may provide the central processor/accelerator power management system 202 discussed above with reference to FIG. 2. As such, the central processor/accelerator power management system 300 may be provided by the IHS 100 discussed above with reference to FIG. 1 and/or may include some or all of the components of the IHS 100, and in specific examples may be provided by one or more server devices. However, while illustrated and discussed as being provided by one or more server devices, one of skill in the art in possession of the present disclosure will recognize that the functionality of the central processor/accelerator power management system 300 discussed below may be provided by other devices that are configured to operate similarly as the central processor/accelerator power management system 300 discussed below. In the illustrated embodiment, the central processor/accelerator power management system 300 includes a chassis 302 that houses the components of the central processor/accelerator power management system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a central processor/accelerator power management system engine 304 that is configured to perform the functionality of the central processor/accelerator power management engines and/or central processor/accelerator power management systems discussed below.

In the specific examples illustrated and discussed below, the central processor/accelerator power management engine 304 includes a power management sub-engine 304a that is configured to perform the functionality of the power management sub-engines discussed below, a predictive analyzer sub-engine 304b that is configured to perform the functionality of the predictive analyzer sub-engines discussed below, and a power regulator sub-engine 204c that is configured to perform the functionality of the power regulator sub-engines discussed below. However, while the central processor/accelerator power management engine 304 is illustrated and described as being provided by three sub-engines, one of skill in the art in possession of the present disclosure will recognize that the central processor/accelerator power management engine 304 may be provided in other manners (e.g., a single engine, additional sub-engines, etc.) that will fall within the scope of the present disclosure as well.

The chassis 302 may also house a storage system (not illustrated, but which may include the storage 108 discussed above with reference to FIG. 1) that is coupled to the central processor/accelerator power management engine 304 (e.g., via a coupling between the storage system and the processing system) and that includes a central processor/accelerator power management database 306 that is configured to store any of the information utilized by the central processor/accelerator power management engine 304 discussed below. The chassis 302 may also house a communication system 308 that is coupled to the central processor/accelerator power management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. While a specific central processor/accelerator power management system 300 has been illustrated and described, one of skill in the art in possession of the present disclosure will recognize that central processor/accelerator power management systems (or other devices operating according to the teachings of the present disclosure in a manner similar to that described below for the central processor/accelerator power management system 300) may include a variety of components and/or component configurations for providing conventional functionality, as well as the functionality discussed below, while remaining within the scope of the present disclosure as well.

Figure 4:
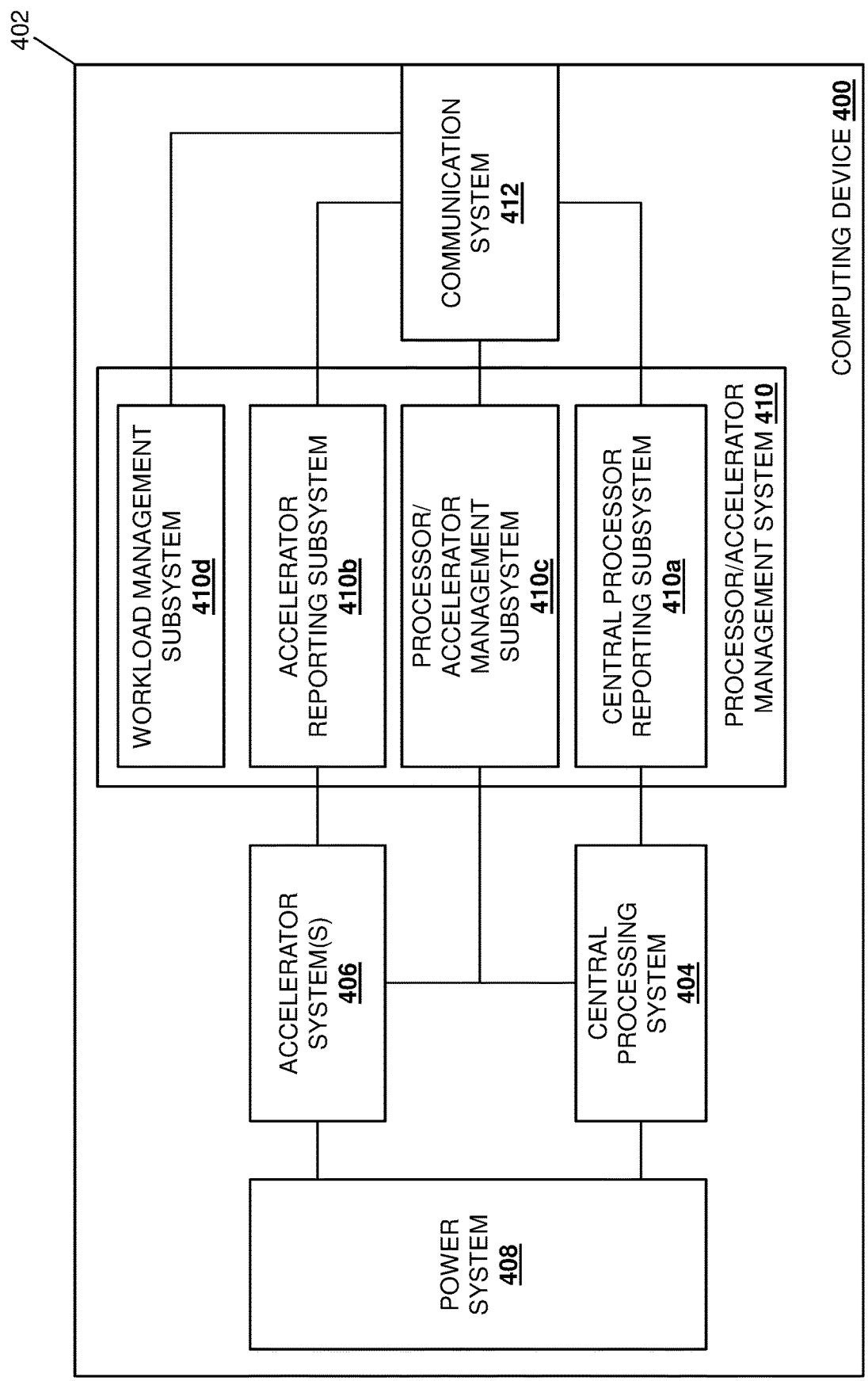
FIG. 4 is a schematic view illustrating an embodiment of a computing device that may be included in the networked system of FIG. 2.

Referring now to FIG. 4, an embodiment of a computing device 400 is illustrated that may provide any or all of the computing devices 206a-206c, 208a-208c, and 210a-210c discussed above with reference to FIG. 2. As such, the computing device 400 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 400 discussed below may be provided by other devices that are configured to operate similarly as the computing device 400 discussed below. In the illustrated embodiment, the computing device 400 includes a chassis 402 that houses the components of the computing device 400, only some of which are illustrated and discussed below. For example, the chassis 402 may house a central processing system 404 that may include a Central Processing Unit (CPU) and/or other processing system components that would be apparent to one of skill in the art in possession of the present disclosure.

The chassis 402 may also house one or more accelerator systems 406 that may include Graphics Processing Units (GPUs), Field Programmable Gate Arrays (FPGAs), Smart Network Interface Controllers (SmartNIC), and/or other accelerator systems that would be apparent to one of skill in the art in possession of the present disclosure. The chassis 402 may also house a power system 408 that is coupled to the central processing system 404 and the accelerator system(s) 406, and that may be provided by a Power Supply Unit (PSU) and/or other power system components that would be apparent to one of skill in the art in possession of the present disclosure. The chassis 402 may also house a processor/accelerator management system 410 that, in the embodiments illustrated and discussed below, includes a central processor reporting subsystem 410a that is coupled to the central processing system 404, an accelerator reporting subsystem 410b that is coupled to the accelerator system(s) 406, a processor/accelerator management subsystem 410c that is coupled to each of the central processing system 404 and the accelerator system(s) 406, and a workload management subsystem 410d that may be provided by or included in an operating system (e.g., provided by the central processing system 404 via the execution of instructions included on a memory system (not illustrated) in the computing device). As discussed below, in a specific example, the workload management subsystem 410d may be provided by an in-band agent such as an iDRAC Service Module (iSM) included in an operating system provided with a server device available from DELL® Inc. of Round Rock, Tex., United States.

The chassis 302 may also house a communication system 412 that is coupled to the each of the central processor reporting subsystem 410a, the accelerator reporting subsystem 410b, the processor/accelerator management subsystem 410c, and the workload management subsystem 410d in the processor/accelerator management system 410, and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. However, while a specific computing device 300 has been illustrated, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well. For example, as discussed below, the computing device 400 may include a remote access controller device such as the integrated DELL® Remote Access Controller (iDRAC) available in server devices provided by DELL® Inc. of Round Rock, Tex., United States; a Baseboard Management Controller (BMC), and/or other remote access controller devices that would be apparent to one of skill in the art in possession of the present disclosure as being capable of performing the functionality discussed below.

Figure 5:
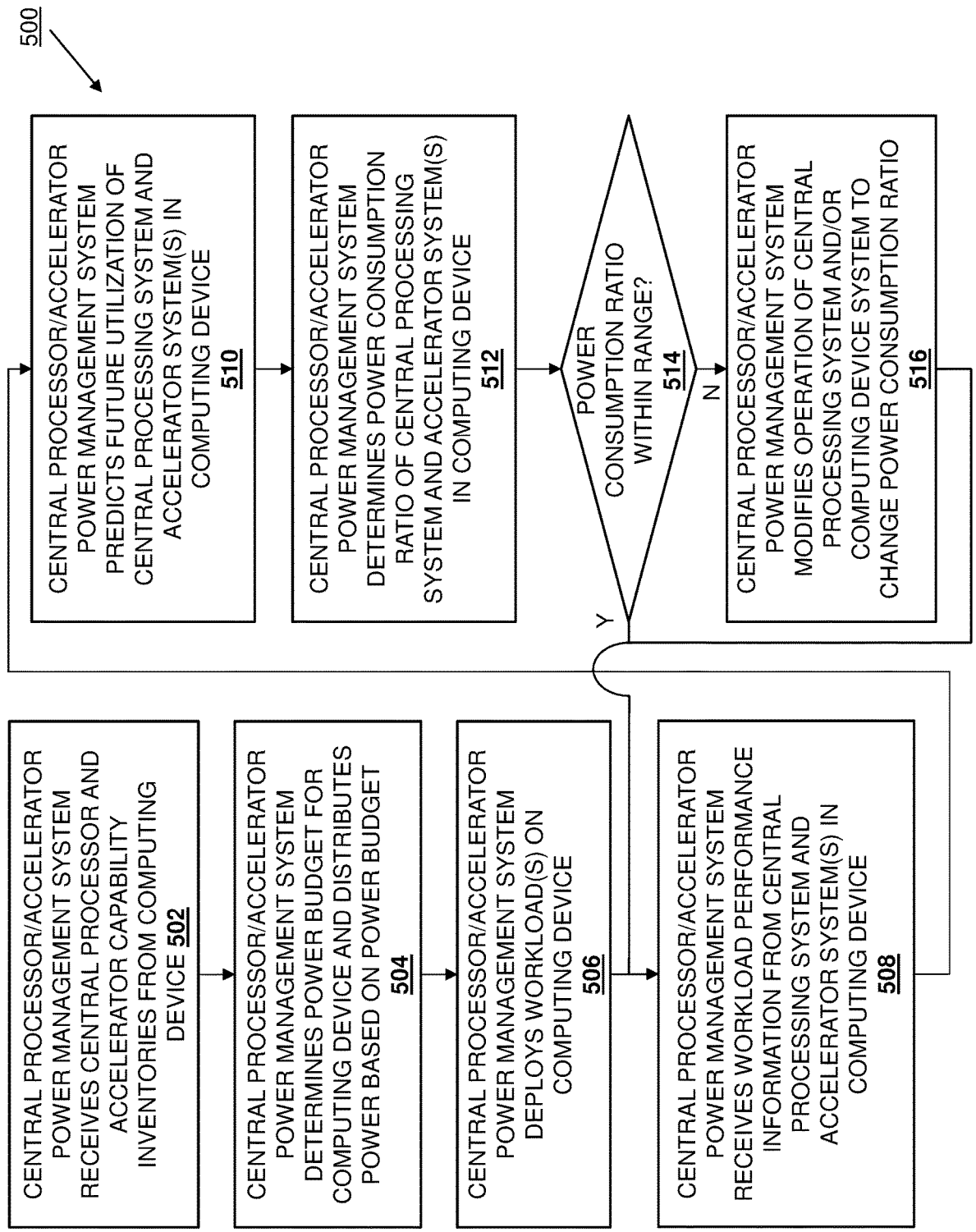
FIG. 5 is a flow chart illustrating an embodiment of a method for managing power for a central processing system and accelerator system(s).

Referring now to FIG. 5, an embodiment of a method 500 for managing power for a central processing system and at least one accelerator system is illustrated. As discussed below, the systems and methods of the present disclosure provide for the regulation of power consumption by a processor and accelerator(s) in a computing device according to the workload(s) they perform and their associated runtime needs in order to increase the power efficiency of that computing device. For example, the networked system of the present disclosure may include a computing device having a central processing system and accelerator system(s). A central processor/accelerator power management system coupled to the computing device via a network operates to deploy workload(s) on the computing device and receive workload performance information from the computing device that identifies a central processing system utilization of the central processing system in performing the workload(s) and an accelerator system utilization of each accelerator system in performing the workload(s). Based on the workload performance information, the computing device determines a first power consumption ratio of the central processing system and the accelerator system(s) in performing the workload(s), and modifies operation of at least one of the central processing system and the accelerator system(s) to change the first power consumption ratio to a second power consumption ratio that is more power efficient than the first power consumption ratio. As such, power consumed by the computing device is conserved without any performance impact to the workloads being performed by the computing device.

Figure 6A:
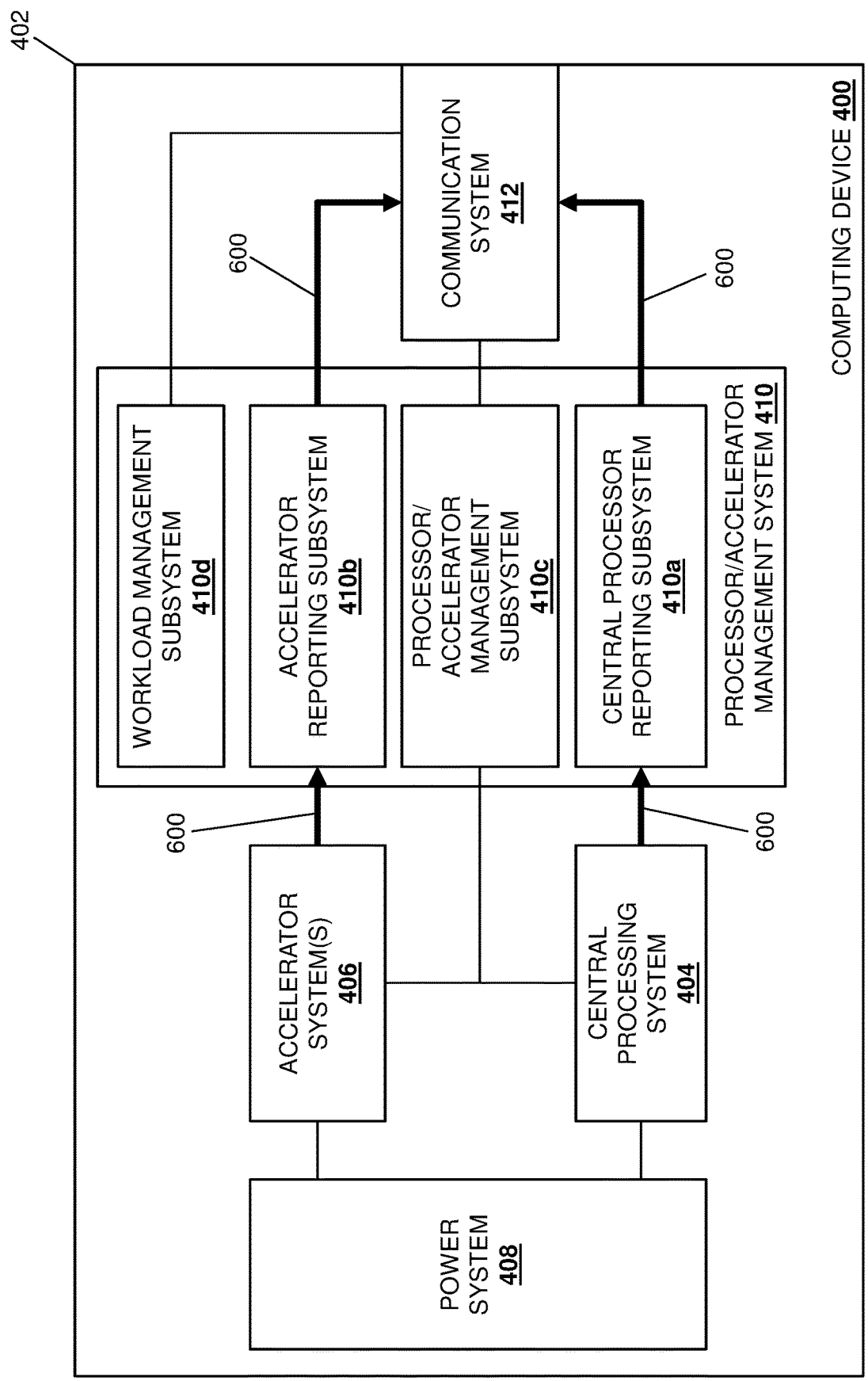
FIG. 6A is a schematic view illustrating an embodiment of the computing device of FIG. 4 operating during the method of FIG. 5.
Figure 6B:
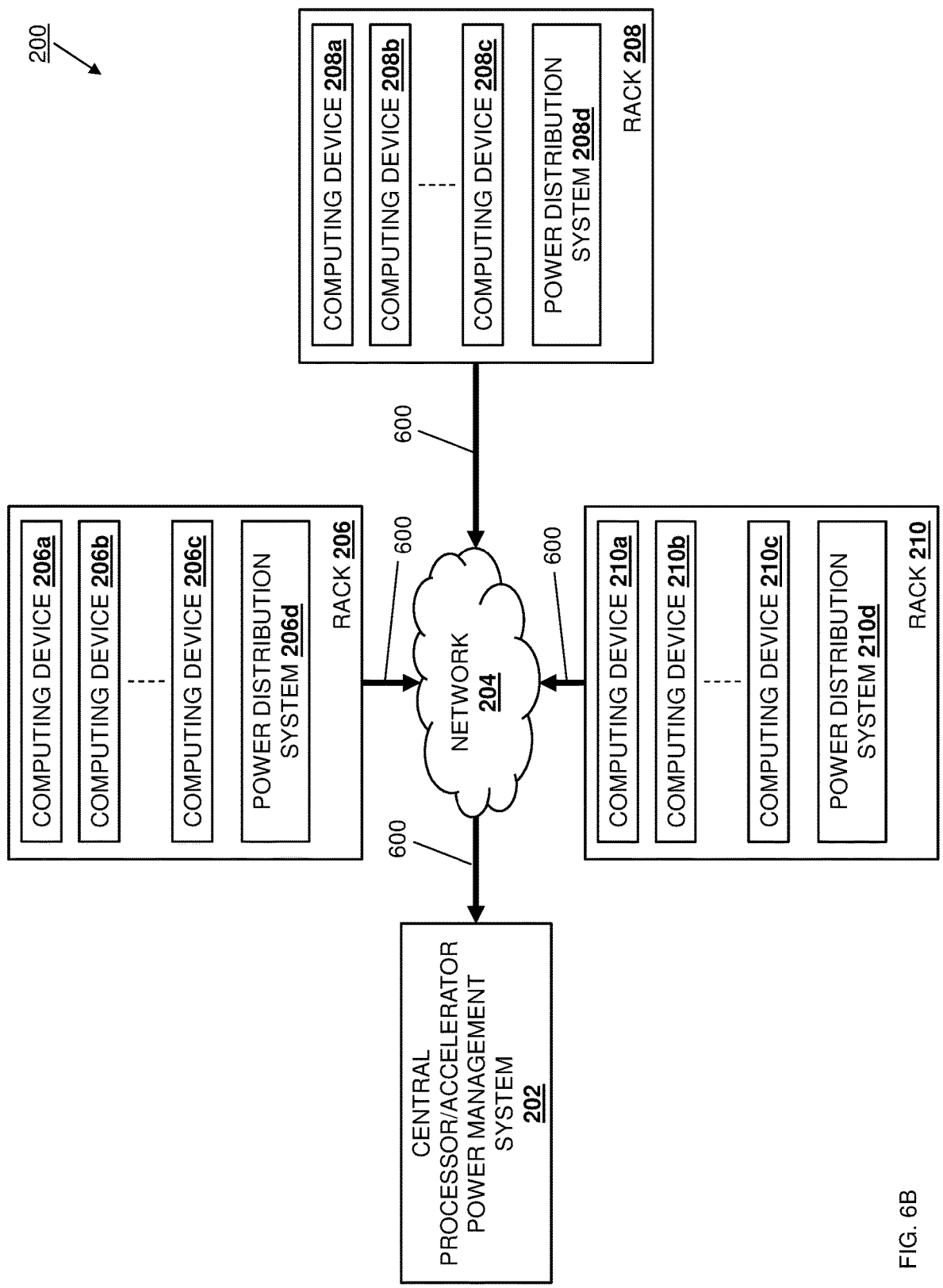
FIG. 6B is a schematic view illustrating an embodiment of the networked system of FIG. 2 operating during the method of FIG. 5.
Figure 6C:
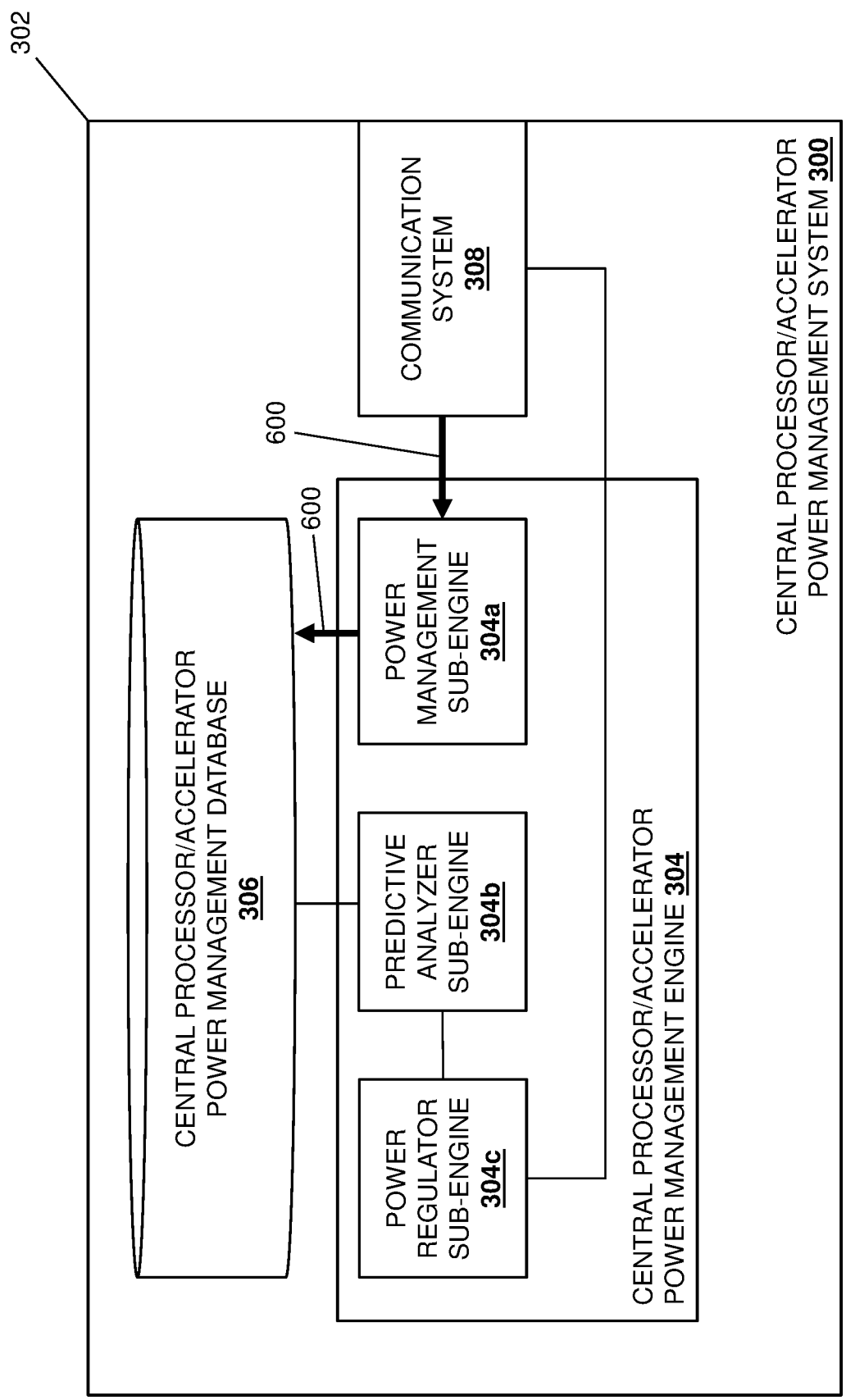
FIG. 6C is a schematic view illustrating an embodiment of the central processor/accelerator power management system of FIG. 3 operating during the method of FIG. 5.

The method 500 begins at block 502 where a central processor/accelerator power management system receives central processor and accelerator capability inventories from a computing device. With reference to FIGS. 6A, 6B, and 6C, in an embodiment of block 502, any or each of the computing devices 206a-206c, 208a-208c, and 210a-210c may perform central processor and accelerator capability inventory transmission operations 600 that include the central processor reporting subsystem 410a in the processor/accelerator management system 410 in any or each of those computing devices retrieving inventory information from its central processing system 404, and transmitting that inventory information via its communication system 412 and through the network 204 to the central processor/accelerator power management system 202/300 such that the power management sub-engine 304a in the central processor/accelerator power management engine 304 of the central processor/accelerator power management system 202/300 receives that inventory information via the communication system 308 in the central processor/accelerator power management system 202/300 and stores that inventory information in the central processor/accelerator power management database 306 in the central processor/accelerator power management system 202/300. As will be appreciated by one of skill in the art in possession of the present disclosure, inventory information associated with a central processing system may identify Central Processing Unit (CPU) cores, other central processing system components, and/or any of a variety of central processing system components that one of skill in the art in possession of the present disclosure would recognize may be utilized to provide the functionality discussed below.

Similarly, the central processor and accelerator capability inventory transmission operations 600 may include the accelerator reporting subsystem 410b in the processor/accelerator management system 410 in any or each of those computing devices retrieving inventory information from its accelerator system(s) 406, and transmitting that inventory information via its communication system 412 and through the network 204 to the central processor/accelerator power management system 202/300 such that the power management sub-engine 304a in the central processor/accelerator power management engine 304 of the central processor/accelerator power management system 202/300 receives that inventory information via the communication system 308 in the central processor/accelerator power management system 202/300 and stores that inventory information in the central processor/accelerator power management database 306 in the central processor/accelerator power management system 202/300. As will be appreciated by one of skill in the art in possession of the present disclosure, inventory information associated with accelerator system(s) may identify accelerator cores (e.g., Graphics Processing Unit (GPU) cores), FPGA cards, SmartNIC components, and/or any of a variety of accelerator components that one of skill in the art in possession of the present disclosure would recognize may be utilized to provide the functionality discussed below.

In specific examples, the retrieval and transmission of the inventory information at block 502 may be performed by remote access controller devices in each of the computing devices, which one of skill in the art in possession of the present disclosure will recognize may have access to such information or may have that information stored in its database. As such, following block 502, the central processor/accelerator power management database 306 may store inventories for central processing systems and accelerator systems in any or each of the computing devices 206a-206c, 208a-208c, and 210a-210c. In the specific examples discussed below, the inventories for the central processing systems and accelerator systems in the computing devices are utilized to retrieve telemetry data for the components that are identified in those inventories and that operate to enable the performance of workloads by the central processing systems and accelerator systems. However, one of skill in the art in possession of the present disclosure will appreciate how telemetry data or other workload performance information may be retrieved from the central processing systems and accelerator systems in the computing devices as they perform workloads using other techniques while remaining within the scope of the present disclosure as well.

Figure 7:
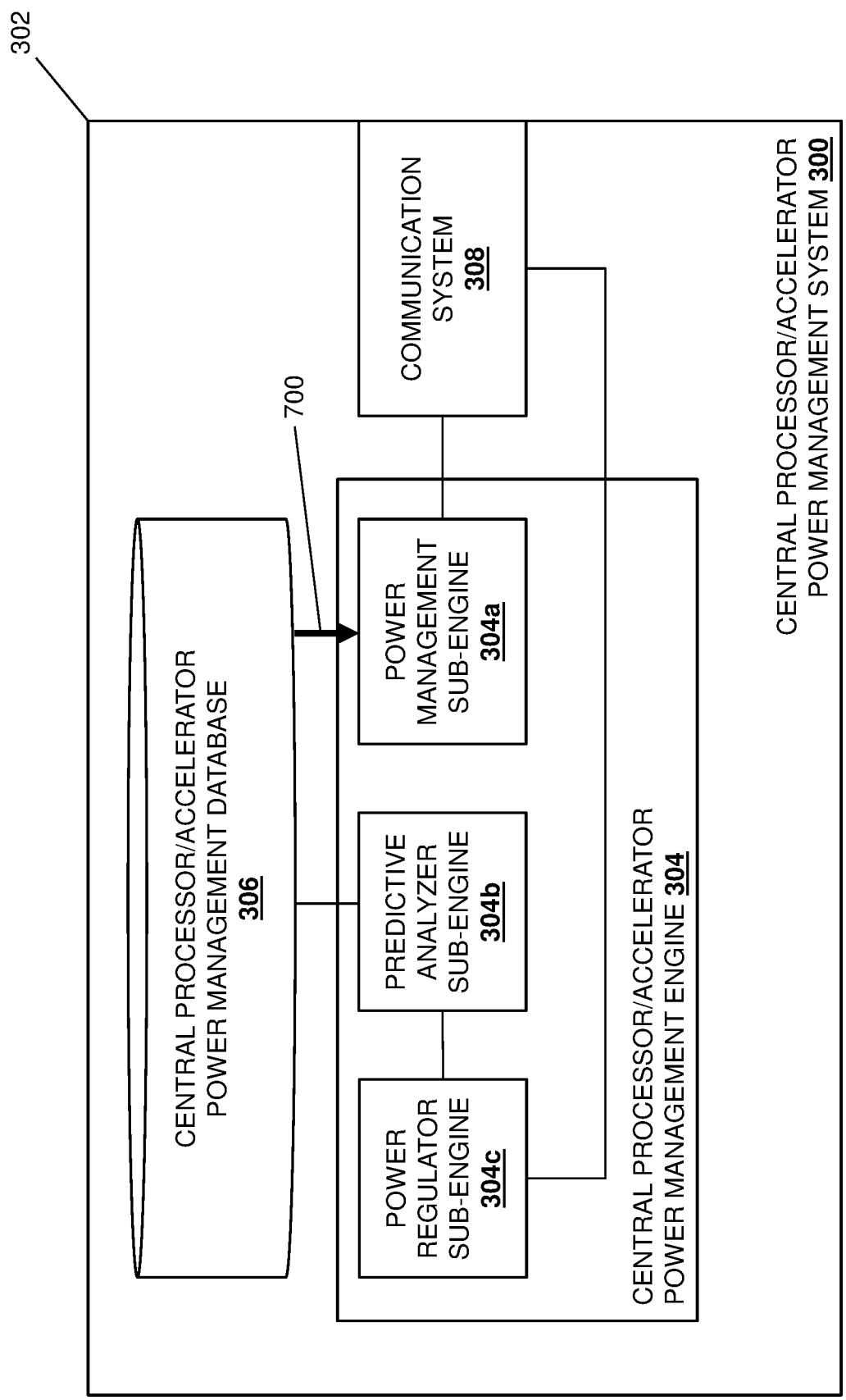
FIG. 7 is a schematic view illustrating an embodiment of the central processor/accelerator power management system of FIG. 3 operating during the method of FIG. 5.

The method 500 then proceeds to block 504 where the central processor/accelerator power management system determines a power budget for the computing device and distributes power based on the power budget. With reference to FIG. 7, in an embodiment of block 504, the power management sub-engine 304a in the central processor/accelerator power management engine 304 of the central processor/accelerator power management system 202/300 may perform power budget determination operations 700 that may include the power management sub-engine 304a retrieving power budget information from the central processor/accelerator power management database 306 and determining power budgets for groups of the computing devices 206a-206c, 208a-208c, and 210a-210c. For example, at block 504, the power management sub-engine 304a may use the power budget information to determine a power budget for each of the racks 206, 208, and 210, thus providing a first power cap for the computing devices 206a-206c in the rack 206, a second power cap for the computing devices 208a-208c in the rack 208, and a third power cap for the computing devices 210a-210c in the rack 210. However, while the computing devices in the networked system 200 are illustrated and described as being grouped or "clustered" by virtue of their location in particular racks and power capped by group/cluster, one of skill in the art in possession of the present disclosure will appreciate that the computing devices in the networked system 200 may be grouped or clustered based on other criteria (e.g., performance criteria that groups/clusters computing device with similar performance, power efficiency criteria that groups/clusters computing devices with similar power efficiency, etc.), and thus power capped by group/cluster using those groups/clusters (e.g., which may group/cluster computing devices across racks), while remaining within the scope of the present disclosure as well.

Figure 8A:
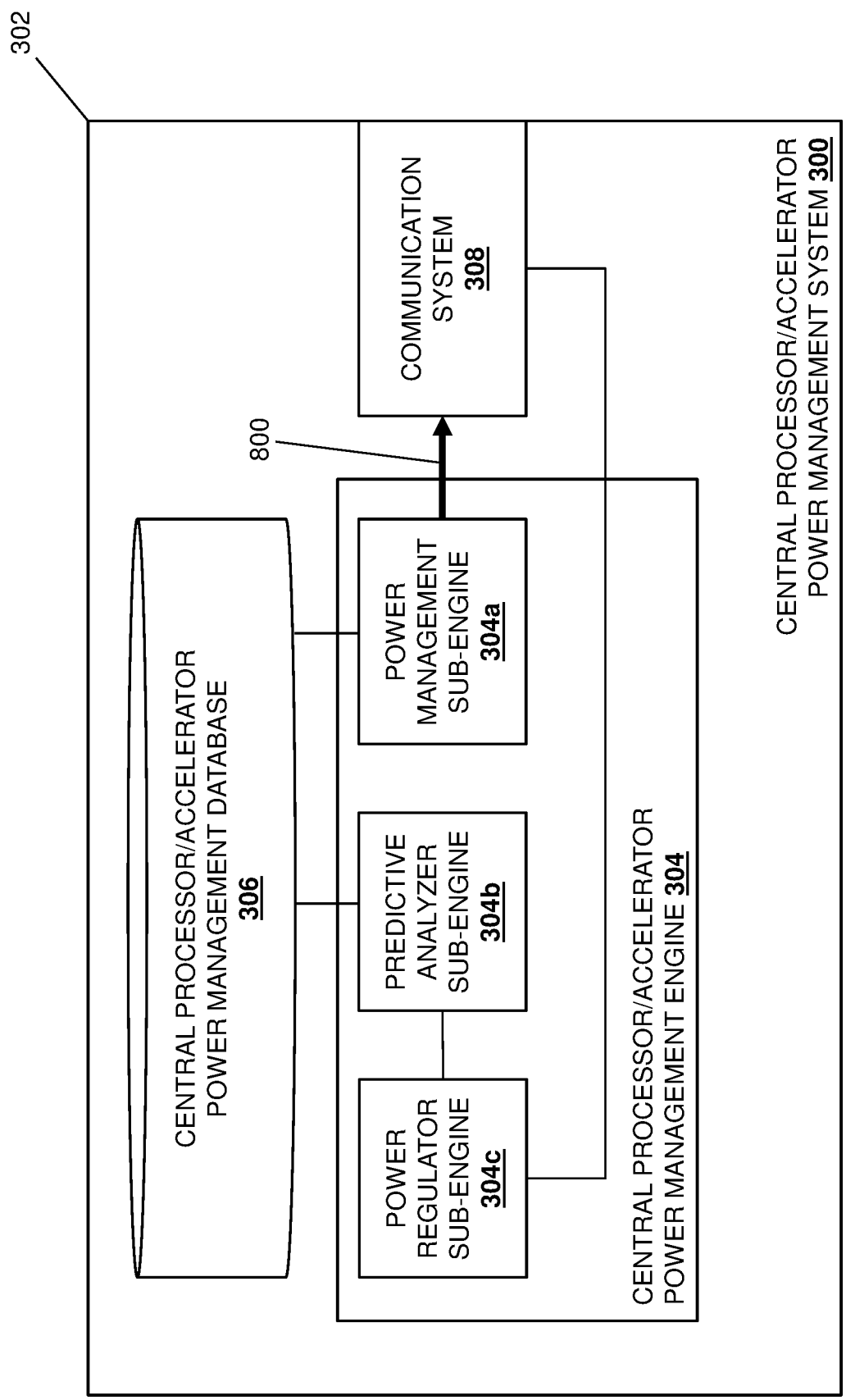
FIG. 8A is a schematic view illustrating an embodiment of the central processor/accelerator power management system of FIG. 3 operating during the method of FIG. 5.
Figure 8B:
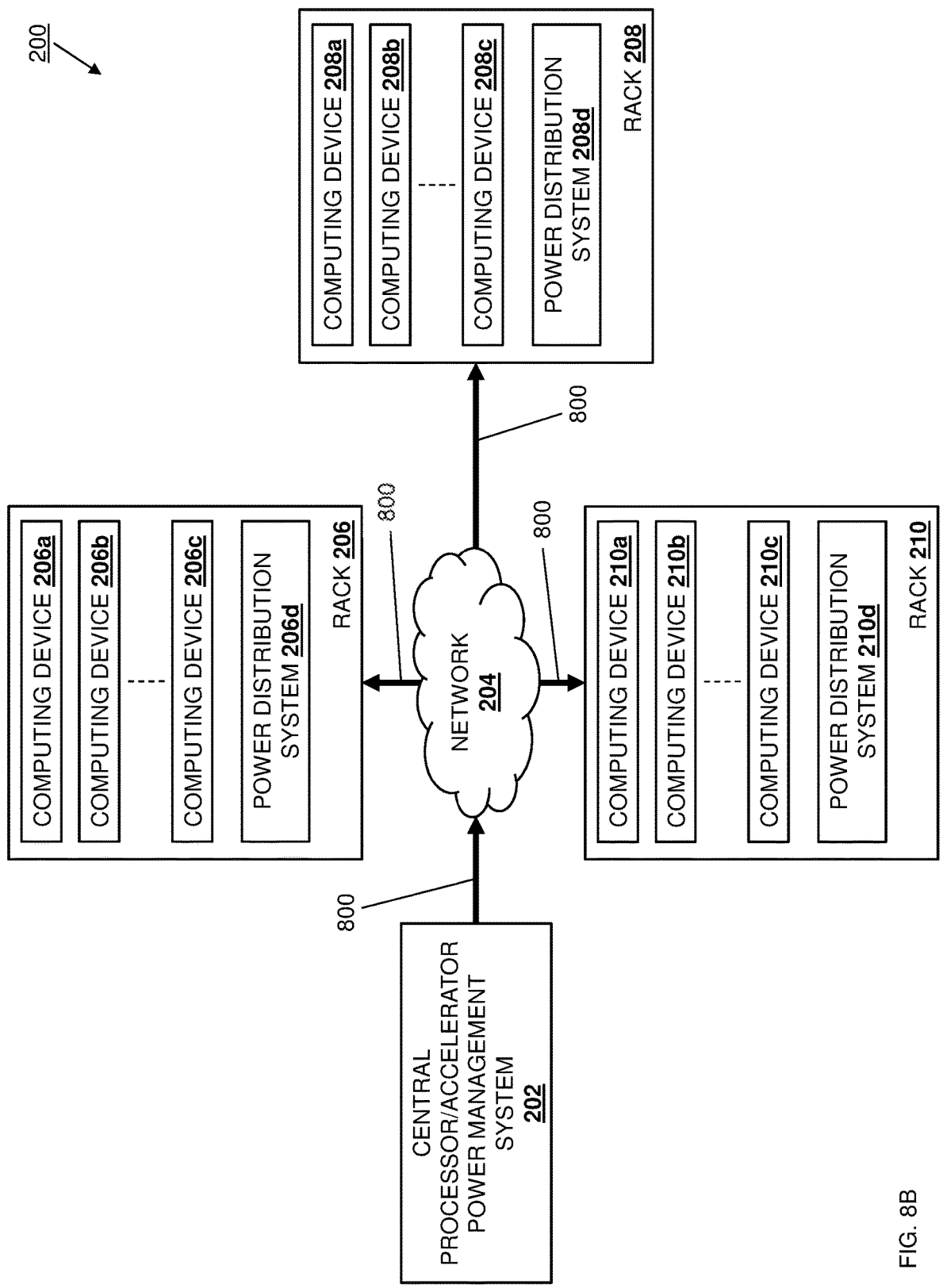
FIG. 8B is a schematic view illustrating an embodiment of the networked system of FIG. 2 operating during the method of FIG. 5.

At block 504 and subsequent to determining the power budgets, the power management sub-engine 304a in the central processor/accelerator power management engine 304 of the central processor/accelerator power management system 202/300 may cause power to be distributed to the computing devices 206a-206c, 208a-208c, and 210a-210c according to the power budgets. As illustrated in FIGS. 8A and 8B, at block 504, the power management sub-engine 304a may perform power distribution operations 800 that may include providing the respective power budgets to each of the racks 206, 208, and 210, which one of skill in the art in possession of the present disclosure will recognize may operate to power cap those racks according to their respective power budgets. For example, the power capping/power budgeting may be enabled at the power distribution systems 206d, 208d, and 210d in each of the respective racks 206, 208, and 210, and may prevent the computing devices in those racks from consuming more power than is budgeted according to that power cap. [As such, following block 504, the computing devices in any particular one of the racks 206, 208, and 210 may consume power up to the power cap provided using the power budget for that rack. Furthermore, as discussed below, individual computing devices within a rack may be power capped individually using the power available via the power cap applied to that rack, thus allowing that computing device to utilize power up to its individual power cap.

The method 500 then proceeds to block 506 where the central processor/accelerator power management system deploys one or more workloads on the computing device. In an embodiment, at block 506, workload(s) may be deployed on computing devices in the networked system 200 (e.g., by the central processor/accelerator power management system 202 or other workload deployment systems in the networked system 200) using a variety of workload deployment techniques that would be apparent to one of skill in the art in possession of the present disclosure, resulting in at least some subset of the computing devices 206a-206c, 208a-208c, and 210a-210c performing one or more workloads. As discussed below, any of the workloads deployed at block 506 may be characterized based on characteristics of those workloads, and may be deployed on computing devices based on the ability of those computing devices to perform workloads with those characteristics. For example, workloads may be characterized as compute-intensive workloads, Input/Output (I/O)-intensive workloads, graphics intensive workloads, and/or based on any other workload characteristics that would be apparent to one of skill in the art in possession of the present disclosure, and may be deployed based on those characteristics such that compute-intensive workloads are deployed on CPUs, I/O-intensive workloads are deployed on SmartNICs, graphics intensive workloads are deployed on GPUs, etc. As such, following block 506, any particular computing device 400 may have its central processing system 404 and accelerator system(s) 406 operating to perform the workloads deployed on that computing device.

Figure 9A:
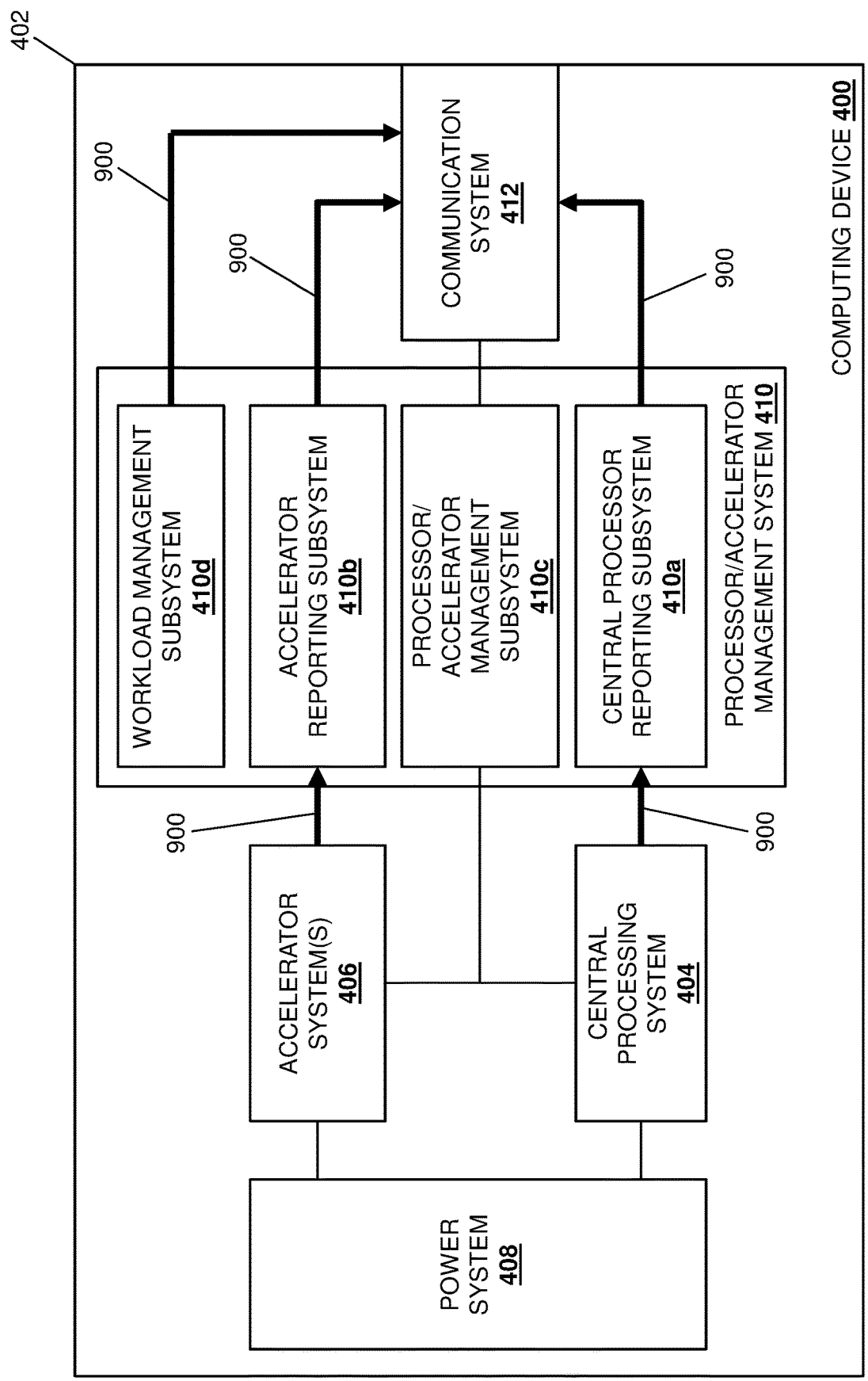
FIG. 9A is a schematic view illustrating an embodiment of the computing device of FIG. 4 operating during the method of FIG. 5.
Figure 9B:
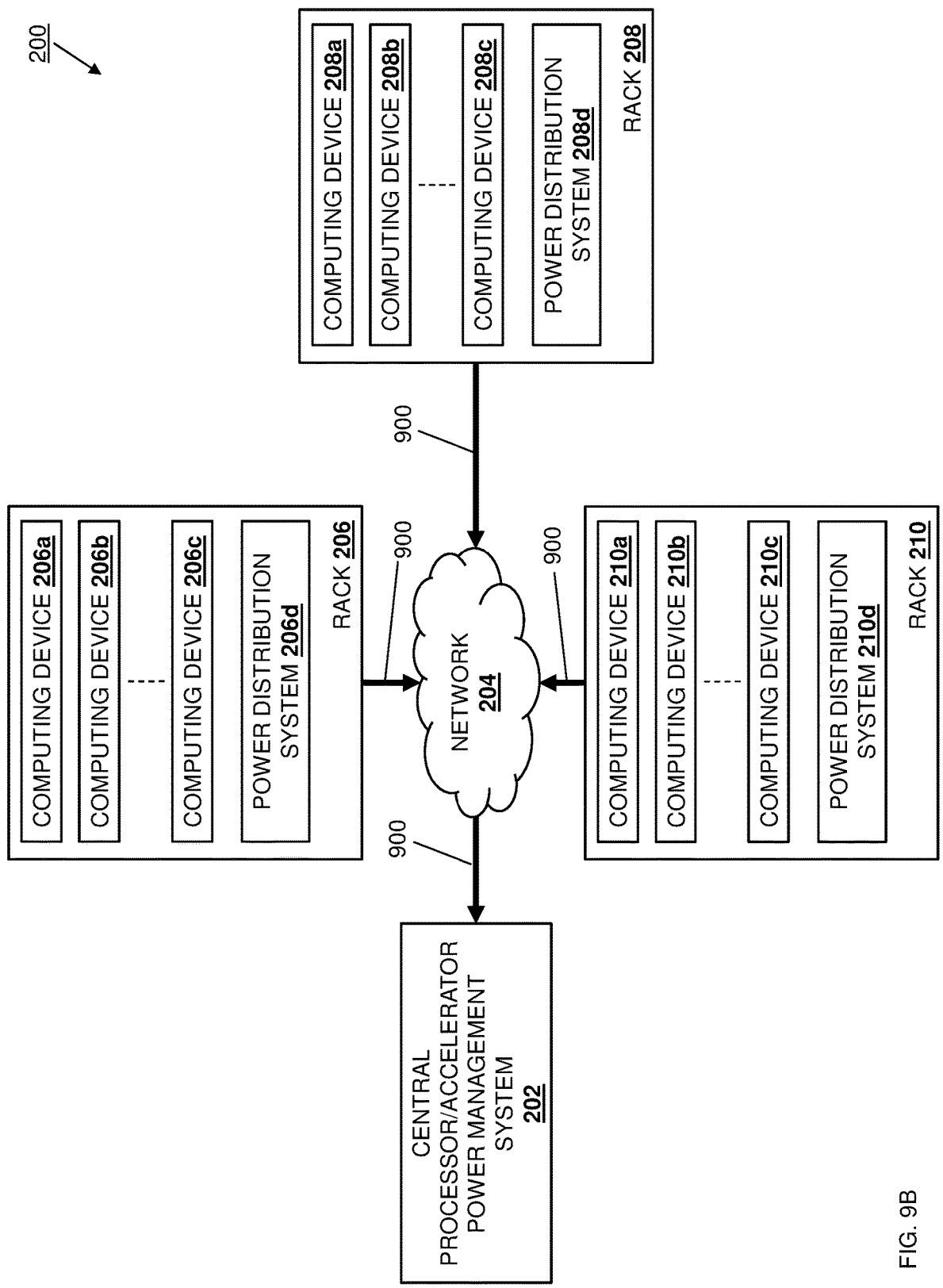
FIG. 9B is a schematic view illustrating an embodiment of the networked system of FIG. 2 operating during the method of FIG. 5.
Figure 9C:
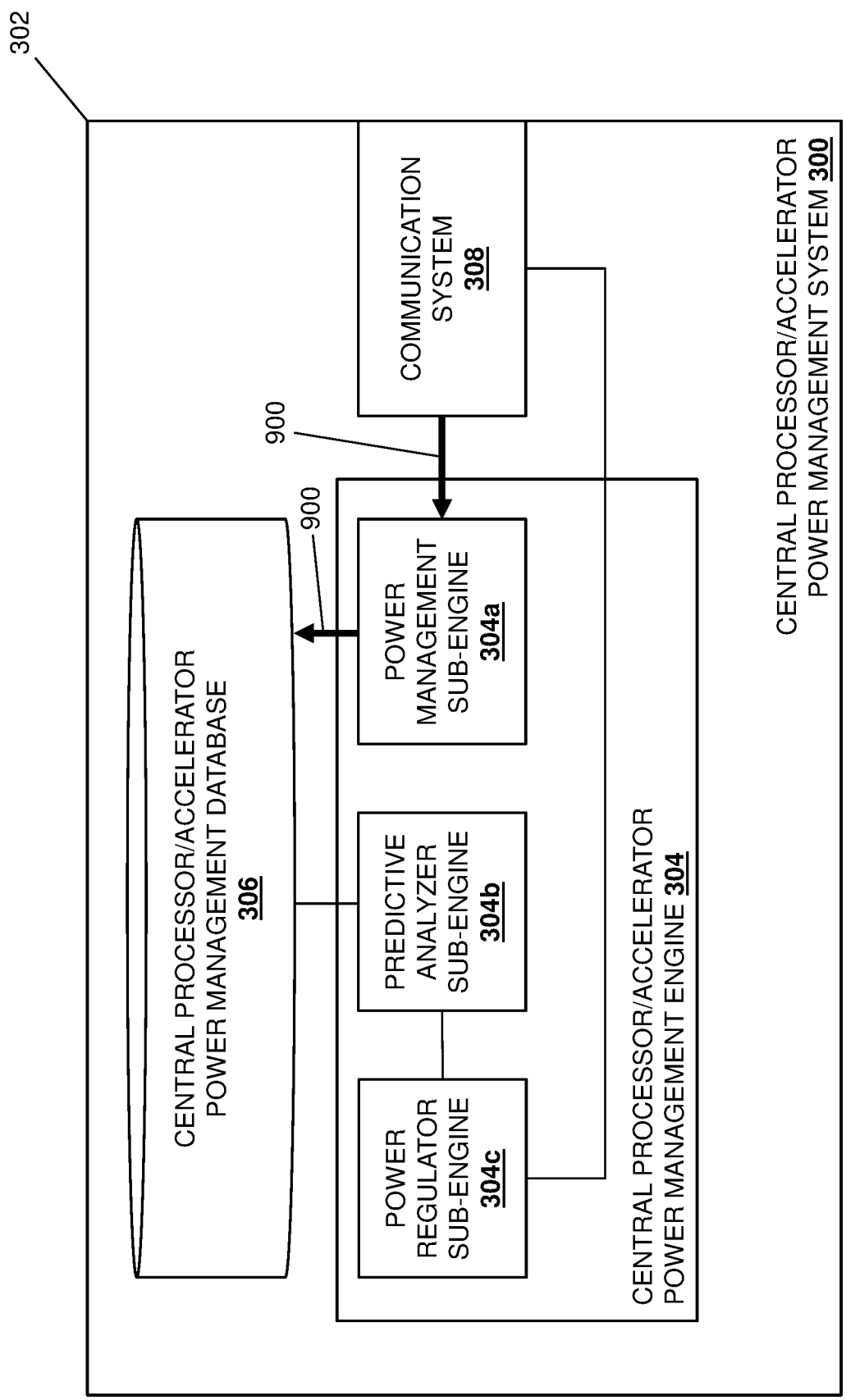
FIG. 9C is a schematic view illustrating an embodiment of the central processor/accelerator power management system of FIG. 3 operating during the method of FIG. 5.

The method 500 then proceeds to block 508 where the central processor/accelerator power management system receives workload performance information from the central processing system and accelerator system(s) in the computing device. With reference to FIGS. 9A, 9B, and 9C, in an embodiment of block 508, any computing device 206a-206c, 208a-208c, and 210a-210c performing a workload may perform central processor and accelerator workload performance information transmission operations 600 that include the central processor reporting subsystem 410a in the processor/accelerator management system 410 in any or each of those computing devices retrieving or identifying workload performance information from its central processing system 404, and transmitting that workload performance information via its communication system 412 and via the network 204 to the central processor/accelerator power management system 202/300 such that the power management sub-engine 304a in the central processor/accelerator power management engine 304 of the central processor/accelerator power management system 202/300 receives that workload performance information via the communication system 308 in the central processor/accelerator power management system 202/300 and stores that workload performance information in the central processor/accelerator power management database 306 in the central processor/accelerator power management system 202/300. As will be appreciated by one of skill in the art in possession of the present disclosure, workload performance information associated with a central processing system may include any telemetry data generated in response to the operation central processing system components in the central processing system 404 during the performance of the workload(s), with that telemetry data streaming real-time (or near real-time) utilization by those central processing system components while they perform the workload(s).

Similarly, the central processor and accelerator capability workload performance transmission operations 900 may include the accelerator reporting subsystem 410b in the processor/accelerator management system 410 in any or each of those computing devices retrieving workload performance information from its accelerator system(s) 406, and transmitting that workload performance information via its communication system 412 and via the network 204 to the central processor/accelerator power management system 202/300 such that the power management sub-engine 304a in the central processor/accelerator power management engine 304 of the central processor/accelerator power management system 202/300 receives that workload performance information via the communication system 308 in the central processor/accelerator power management system 202/300 and stores that workload performance information in the central processor/accelerator power management database 306 in the central processor/accelerator power management system 202/300. As will be appreciated by one of skill in the art in possession of the present disclosure, workload performance information associated with accelerator system(s) may include any telemetry data generated in response to the operation of the accelerator system components in the accelerator system(s) 406 during the performance of the workload(s), with that telemetry data streaming real-time (or near real-time) utilization by those accelerator system components while they perform the workload(s).

In specific examples, the retrieval and transmission of the workload performance information at block 508 may be performed by remote access controller devices in each of the computing devices, which one of skill in the art in possession of the present disclosure will recognize may have access to such information or may generate that information. For example, the workload performance information may provide system utilization metrics that may be generated by the central processing system 404, the accelerator system(s) 406, and/or the remote access controller device in response to the performance of the workload(s), as well as hardware performance counter information that is generated/stored in the remote access controller device in response to the performance of the workload(s). Furthermore, in addition to the retrieval and transmission of workload performance information associated with the central processing system 404 and the accelerator system(s) 406, at block 508 the workload management subsystem 410d may also transmit workload performance information via its communication system 412 and via the network 204 to the central processor/accelerator power management system 202/300 such that the power management sub-engine 304a in the central processor/accelerator power management engine 304 of the central processor/accelerator power management system 202/300 receives that workload performance information via the communication system 308 in the central processor/accelerator power management system 202/300 and stores that workload performance information in the central processor/accelerator power management database 306 in the central processor/accelerator power management system 202/300.

In some embodiments, the workload performance information transmitted by the workload management subsystem 410d may identify workload characteristics of the workload(s) being performed by the central processing system 404 and the accelerator system(s) 406 in its computing system 400. Continuing with the specific example provided above, an in-band agent such as the operating system that provides the workload management subsystem 410d discussed above may transmit workload performance information that identifies the workload characteristics of the workload(s) being performed, i.e., whether the workload(s) being performed by the central processing system 404 and the accelerator system(s) 406 are compute-intensive workloads, I/O intensive workloads, graphics intensive workloads, and/or have other workload characteristics that would be apparent to one of skill in the art in possession of the present disclosure.

As such, following block 508, the central processor/accelerator power management database 306 may store telemetry data and/or other workload performance information associated with the performance of workload(s) by central processing systems and accelerator systems in any or each of the computing devices 206a-206c, 208a-208c, and 210a-210c, workload characteristics of the workload(s) being performed by those central processing systems and accelerator systems, and/or any other workload performance information that one of skill in the art in possession of the present disclosure would recognize as allowing the functionality discussed below. In some embodiments, the power management sub-engine 304a in the central processor/accelerator power management engine 304 of the central processor/accelerator power management system 202/300 may classify the telemetry data, workload performance information, and workload characteristics received at block 508 in order to identify, for each computing device performing workload(s), the telemetry data, other workload performance information, and workload characteristics for workloads performed by the central processing system 404 in that computing device, and the telemetry data, other workload performance information, and workload characteristics for workloads for workloads performed by each of the accelerator system(s) 404 in that computing device.

Figure 10:
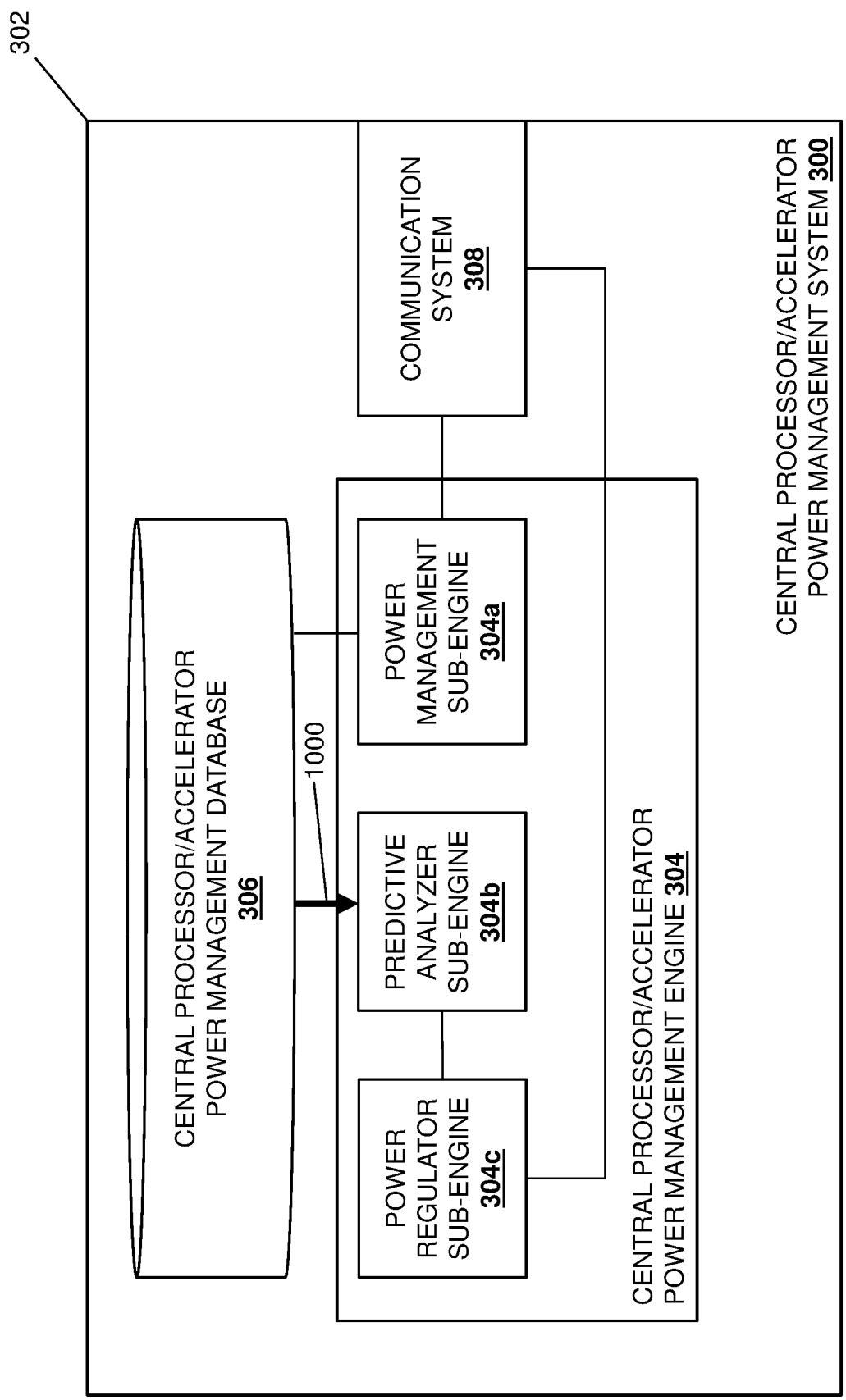
FIG. 10 is a schematic view illustrating an embodiment of the central processor/accelerator power management system of FIG. 3 operating during the method of FIG. 5.

The method 500 then proceeds to block 510 where the central processor/accelerator power management system predicts future utilization of the central processing system and accelerator system(s) in the computing device. With reference to FIG. 10, in an embodiment of block 510, the predictive analyzer sub-engine 304b in the central processor/accelerator power management engine 304 of the central processor/accelerator power management system 202/300 may perform future utilization prediction operations 1000 that include retrieving the workload performance information associated with the central processing system 404 and the accelerator system(s) 406 in any computing device, and using that workload performance information to generate a prediction of the future utilization of that central processing system 404 and those accelerator system(s) 406. In a specific example, the predicted future utilizations generated at block 510 may predict the central processing system and accelerator system utilizations milliseconds into the future, although one of skill in the art in possession of the present disclosure will appreciate other periods of time for future utilization predictions will fall within the scope of the present disclosure as well.

As such, the predictive analyzer sub-engine 304b may retrieve the telemetry data, other workload performance information, and workload characteristics associated with the central processing system 404 and the accelerator system(s) 406 in any computing device, and may use that telemetry data, other workload performance information, and workload characteristics to generate a prediction of the future utilizations of that central processing system 404 and those accelerator system(s) 406. Furthermore, in addition to the workload performance information/telemetry data and workload characteristics received at block 508, the predictive analyzer sub-engine 304b may retrieve historical workload performance information/telemetry data and workload characteristics associated with the central processing system 404 and the accelerator system(s) 406 in any computing device and that was previously stored in the central processor/accelerator power management database 306, and may use that historical workload performance information/telemetry data and workload characteristics to generate a prediction of the future utilization of that central processing system 404 and those accelerator system(s) 406. In a specific example, the predictive analysis provided by the predictive analyzer sub-engine 304b may be based on a combination of a "forecast model" and a "time series model", along with the incorporation of heuristics and assumptions to infer the prediction of resource utilization in the near future, and correspondingly derive the future power usage. As will be appreciated by one of skill in the art in possession of the present disclosure, the future utilization predictions may be generated using other techniques as well while remaining within the scope of the present disclosure.

As will be appreciated by one of skill in the art in possession of the present disclosure, the workload performance information (e.g., the telemetry data, other workload performance information, and workload characteristics associated with the central processing system 404 and the accelerator system(s) 406 in any computing device) may be continuously or periodically transmitted to the central processor/accelerator power management system 202/300, allowing the predictive analyzer sub-engine 304b to continuously or periodically generate the future utilization predictions discussed above that may thus dynamically change over time. In specific examples, such future utilization predictions may predict a future peak power usage by the central processing system 404 and the accelerator system(s) 406 in any computing device, the average power usage by the central processing system 404 and the accelerator system(s) 406 in any computing device, temporal variations in power available to the central processing system 404 and the accelerator system(s) 406 in any computing device, as well as any other future utilization information that one of skill in the art in possession of the present disclosure would recognize as falling within the scope of the present disclosure as well.

Figure 11:
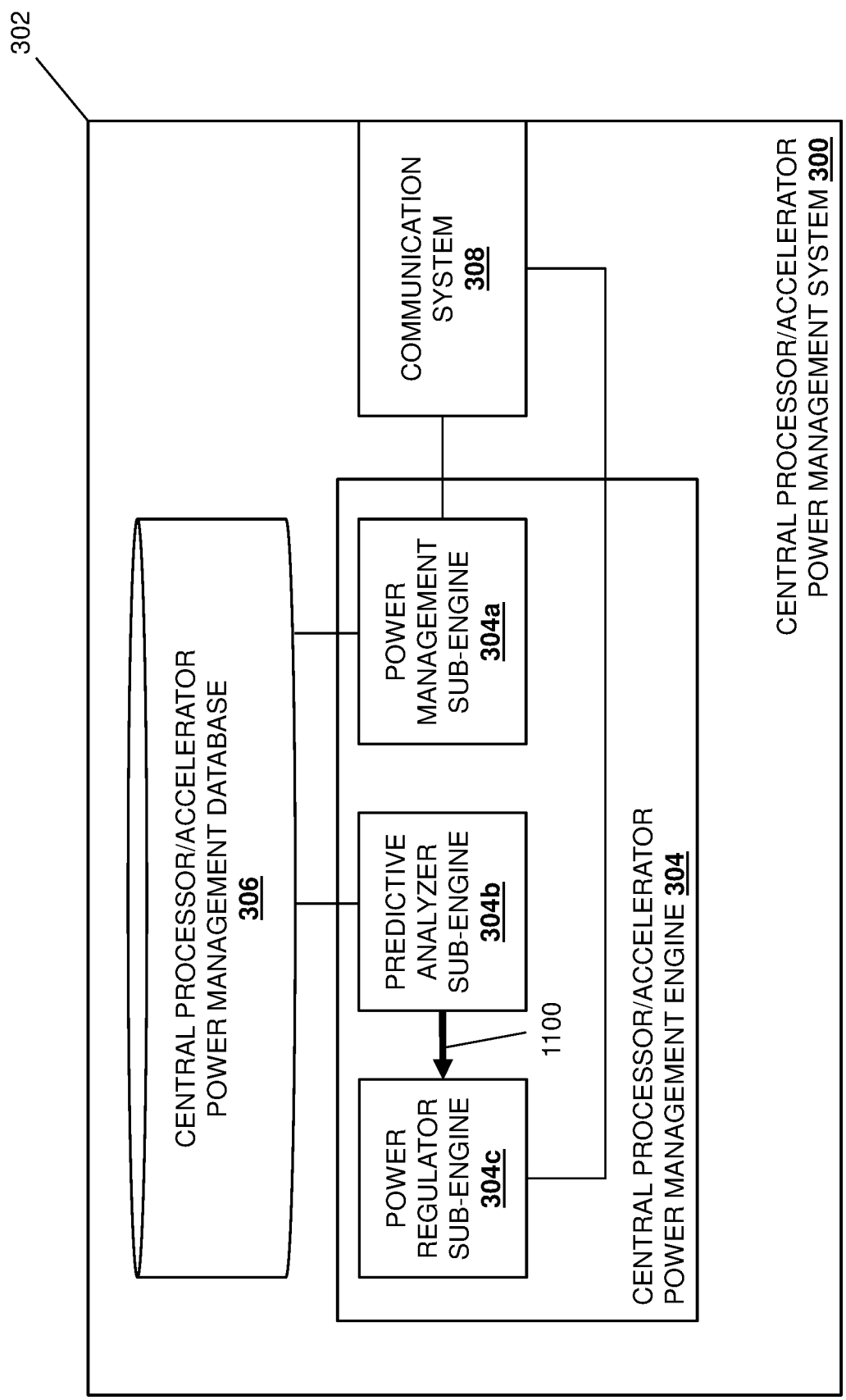
FIG. 11 is a schematic view illustrating an embodiment of the central processor/accelerator power management system of FIG. 3 operating during the method of FIG. 5.

The method 500 then proceeds to block 512 where the central processor/accelerator power management system determines a power consumption ratio of the central processing system and accelerator system(s) in the computing device. With reference to FIG. 11, in an embodiment of block 512, the power regulator sub-engine 304c in the central processor/accelerator power management engine 304 of the central processor/accelerator power management system 202/300 may perform power consumption ratio determination operations 1100 that include receiving the prediction of the future utilizations of the central processing system 404 and the accelerator system(s) 406 in any computing device and, in response, determining a power consumption ratio for that central processing system 404 and those accelerator system(s) 406. For example, the power regulator sub-engine 304c may determine, based on the power cap for the computing device that includes the central processing system 404 and the accelerator system(s) 406 and using the predictions of future utilizations for that central processing system 404 and those accelerator system(s) 406, a power consumption ratio for that central processing system 404 and those accelerator system(s) 406 that may identify relative central processing system utilization and accelerator system utilization of the power cap.

To provide a simplified example, a computing device at issue may include a central processing system (e.g., a CPU) and a single accelerator (e.g., a GPU), and may have been provided a power cap of 1000 watts of power. In response to receiving a prediction that that central processing system and that accelerator will have substantially even power consumption in the near future (e.g., milliseconds in the future), a power consumption ratio of 1:1 (or 500 watts:500 watts) may be determined. In another example, in response to receiving a prediction that that accelerator will consume twice the power as that central processing system in the near future (e.g., milliseconds in the future), a power consumption ratio of 1:2 (or 333 watts:666 watts) may be determined. However, while simplified examples have been provided, one of skill in the art in possession of the present disclosure will appreciate how computing devices may (and typically will) include more than one accelerators (e.g., a GPU, multiple FPGAs, a SmartNIC, etc.), and thus the power consumption ratio determined at block 512 may be more complicated than the examples provided above.

The method 500 then proceeds to decision block 514 where it is determined whether the power consumption ratio is within a range. In an embodiment, at decision block 514, the power regulator sub-engine 304c in the central processor/accelerator power management engine 304 of the central processor/accelerator power management system 202/300 may compare the power consumption ratio determined at block 512 to a power efficient power consumption ratio range. For example, a power efficient power consumption ratio range may have previously been determined or defined that provides the most power efficient power consumption ratios of the central processing system 404 and the accelerator system(s) 406 in a computing system. As discussed above, accelerator systems (e.g., GPUs) may provide central processor/accelerator heterogeneous architectures with power efficiency advantages that result from the capabilities of the accelerator to convert power to computational processing throughput relative to central-processor-only architectures, and thus one of skill in the art in possession of the present disclosure will appreciate how a range of power consumption ratios for the central processing system 404 and accelerator system(s) 406 in any computing device may be determined that provides for the most power efficient operation of that computing device. In a specific example, based on the predictive analysis discussed above, the future power usage may be derived, and the available power may be distributed between in the central processing system and the accelerator system in a manner that minimizes consumption of that power.

If, at decision block 514, it is determined that the power consumption ratio is within the range, the method 500 returns to block 508. In an embodiment, at decision block 514, the power regulator sub-engine 304c may determine that a power consumption ratio determined at block 512 for a central processing system 404 and accelerator system(s) 406 in a computing device is within the power efficient power consumption ratio range, and thus that the central processing system 404 and accelerator system(s) 406 in that computing device are efficiently performing the workload(s) deployed on that computing device (e.g., efficiently using the power cap provided to their computing device), and may return to block 508. As such, the method 500 may loop such that central processor/accelerator power management system 202/300 receives workload performance information from that computing device, predicts future utilization by the processing system 404 and accelerator system(s) 406 in that computing device, and determines a power consumption ratio for that computing device as long as the power consumption ratio determined during that iteration of the method 500 is within the power efficient power consumption ratio range.

Figure 12A:
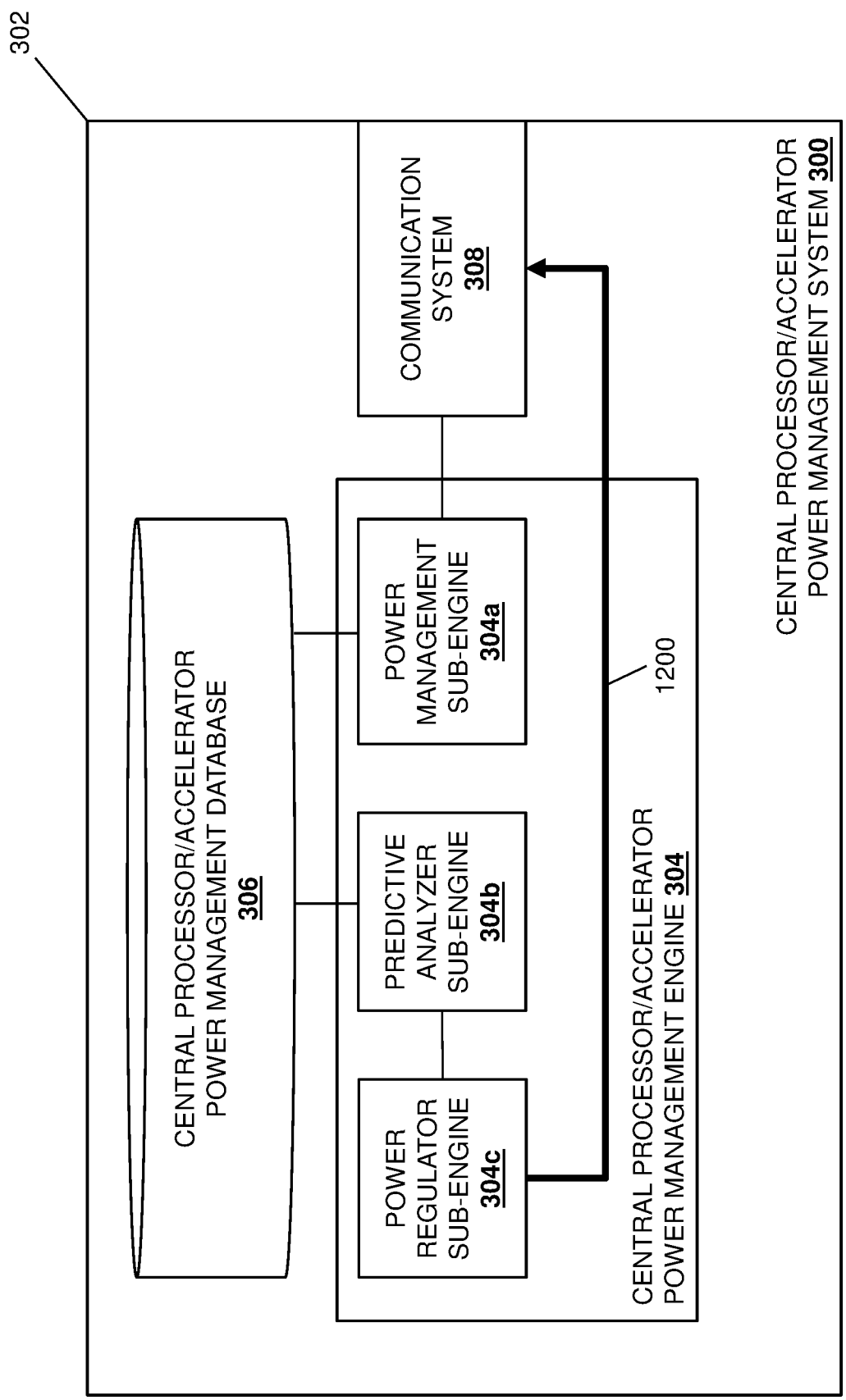
FIG. 12A is a schematic view illustrating an embodiment of the central processor/accelerator power management system of FIG. 3 operating during the method of FIG. 5.
Figure 12B:
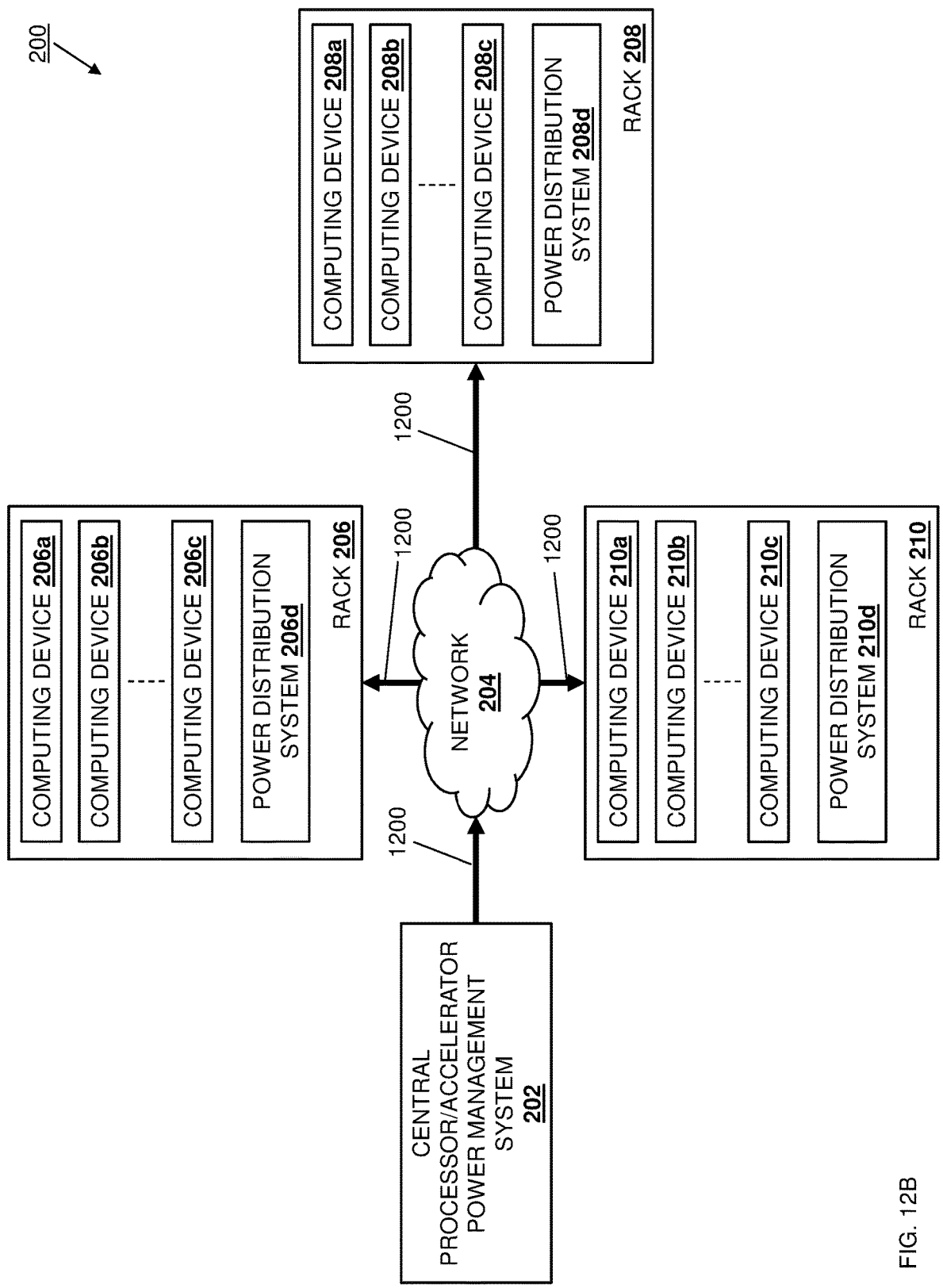
FIG. 12B is a schematic view illustrating an embodiment of the networked system of FIG. 2 operating during the method of FIG. 5.
Figure 12C:
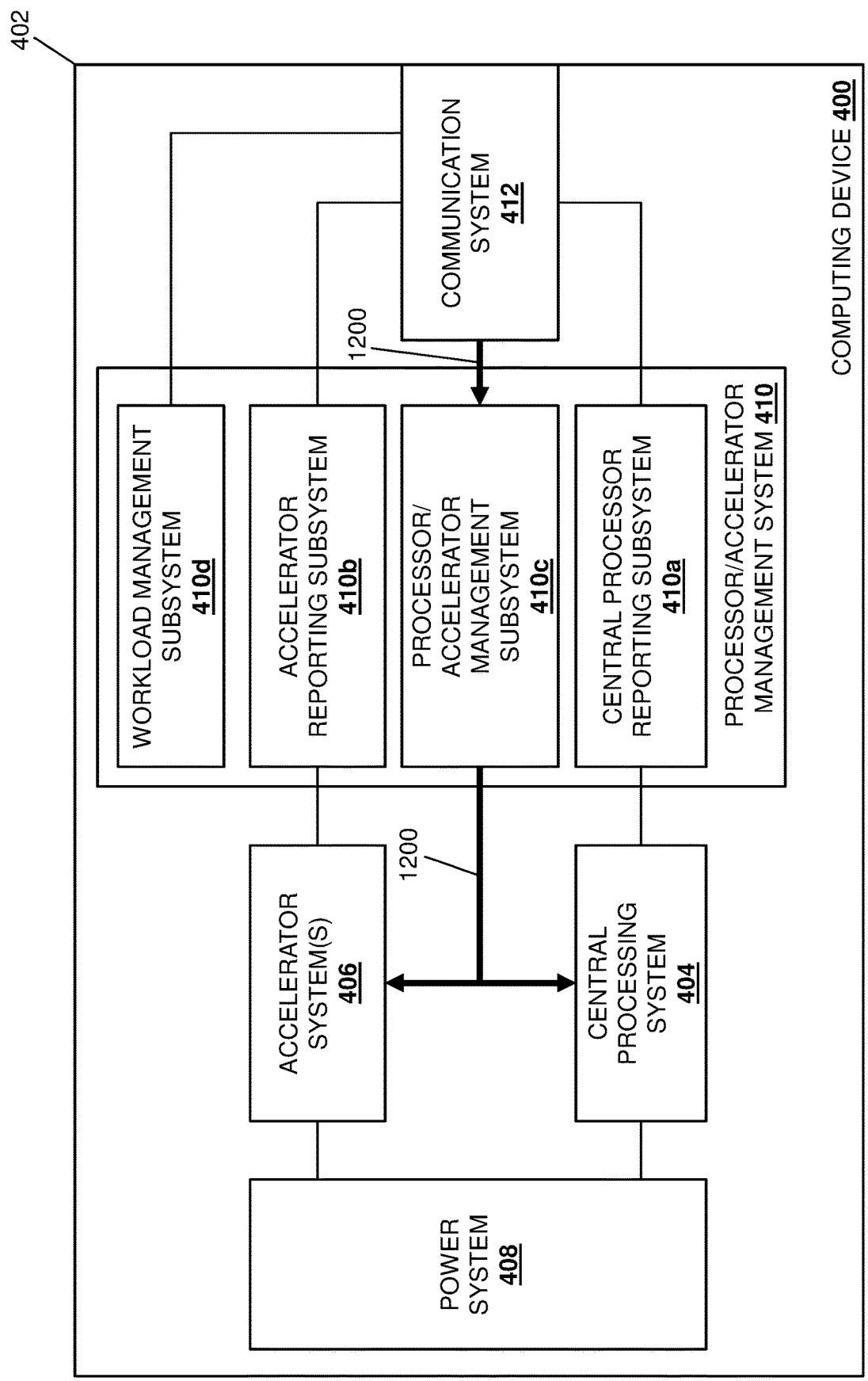
FIG. 12C is a schematic view illustrating an embodiment of the computing device of FIG. 4 operating during the method of FIG. 5.

If at decision block 514, it is determined that the power consumption ratio is not within the range, the method 500 proceeds to block 516 where the central processor/accelerator power management system modifies operation of the central processing system and/or accelerator system(s) in the computing device to change the power consumption ratio. In an embodiment, at decision block 514, the power regulator sub-engine 304c may determine that a power consumption ratio determined at block 512 for a central processing system 404 and accelerator system(s) 406 in a computing device is not within the power efficient power consumption ratio range, and thus that the central processing system 404 and accelerator system(s) 406 in that computing device are inefficiently performing the workload(s) deployed on that computing device (e.g., inefficiently using the power cap provided to their computing device), and may proceed to block 516. With reference to FIGS. 12A, 12B, and 12C, at block 516, the power regulation sub-engine 304c in the central processor/accelerator power management engine 304 of the central processor/accelerator power management system 202/300 may perform operation modification operations 1200 that include transmitting instructions via its communication system 308 and through the network 204 to any of the computing devices, which may be received by the processor/accelerator management subsystem 410c in that processor/accelerator management system 410 in that computing device via its communication system 412, and used to cause the operation of the central processing system 404 and accelerator system(s) 406 in any of the computing devices to be modified.

For example, the instructions transmitted by the power regulation sub-engine 304c at block 516 may include remote access controller instructions that cause the remote access controller device (e.g., which provides a portion of the processor/accelerator management subsystem 410c in this example) in a computing device to modify the operation of the central processing system 404 in that computing device, in-band/iSM instructions that cause the in-band agent/iSM (e.g., which provides a portion of the processor/accelerator management subsystem 410c in this example) to modify operation of the accelerator system(s) 406, and/or any other instructions to any other computing device subsystems that one of skill in the art in possession of the present disclosure would recognize as providing for the modification of operations by the central processing system 404 and the accelerator system(s) 406. In a specific example, the operation modification performed at block 516 may include modifying the performance state (P-state) of the central processing system (e.g., a CPU) and the accelerator system(s) 406 (e.g., a GPU), and conventional server devices limit such P-state modifications to being performed by a remote access controller device for a CPU, and being performed by an in-band agent/iSM for a GPU. However, one of skill in the art in possession of the present disclosure will appreciate how future server devices may allow such operations modifications to be performed via different subsystems, and thus the modification of the operation of the central processing system 404 and accelerator system(s) 406 by other subsystems will fall within the scope of the present disclosure as well.

In a specific example, the modification of the operation of the central processing system 404 and accelerator system(s) 406 in a computing device may include the utilization of Dynamic Voltage and Frequency Scaling (DVFS) techniques that operate to change the voltage/frequency of the central processing system and/or accelerator system(s) in order to indirectly cause them to slow down (or speed up) processing operations. In another specific example, the modification of the operation of the central processing system 404 and accelerator system(s) 406 in a computing device may include the utilization of "no-operation (no-op)" instructions that that operate to slow down the central processing system 404 and accelerator system(s) 406. However, while several specific examples of the modification of the operation of the central processing system 404 and accelerator system(s) 406 in a computing device, one of skill in the art in possession of the present disclosure will recognize that other operation modification techniques will fall within the scope of the present disclosure as well.

As will be appreciated by one of skill in the art in possession of the present disclosure, the modification of the operation of the central processing system 404 and accelerator system(s) 406 in a computing device will operate to change the power consumption ratio for that central processing system 404 and those accelerator system(s) 406 in that computing device, and thus the operation modification operations may be performed to change the power consumption ratio determined for that central processing system 404 and those accelerator system(s) 406 at block 512 to a power consumption ratio that is within the power efficient power consumption ratio discussed above. As such, following block 516, the computing device including the central processing system 404 and the accelerator system(s) 406 that had their operations modified may consume less power while performing their workload(s) at a similar or same performance level prior to the operation modification, or may consume the same amount of power (which is within the power cap for that computing device) while providing higher performance for the workload(s). For example, as will be appreciated by one of skill in the art in possession of the present disclosure, operational modifications to a central processing system that throttle that central processing system an increase the operation of accelerator(s) in order to continue to provide any particular workload(s) may, due to the power efficiency advantage of accelerators discussed above, result in the same power consumption while performing that workload at increased performance level.

The method 500 may then return to block 508. As such, the method 500 may loop such that central processor/accelerator power management system 202/300 receives workload performance information from any computing device, predicts future utilization by the processing system 404 and accelerator system(s) 406 in that computing device, determines a power consumption ratio for that computing device, and modifies the operation of the central processing system and accelerator system(s) in that computing device so that the power consumption ratio for the central processing system and accelerator system(s) in that computing devices is within the power efficient power consumption ratio range, and continues to loop so that the central processing system and accelerator system(s) in all computing devices in the networked system 200 maintain operation within the power efficient power consumption ratio range.

Thus, systems and methods have been described that provide for the regulation of power consumption by CPUs and GPUs in server devices according to the workloads they perform and their associated runtime needs in order to increase the power efficiency of the server device. For example, the networked system of the present disclosure may include a server device having a CPU and GPU. A CPU/GPU power management system coupled to the server device via a network operates to deploy workload(s) on the server device and receive workload performance information from the server device that identifies a CPU utilization of the CPU in performing the workload(s) and a GPU utilization of the GPU in performing the workload(s). Based on the workload performance information, the server device determines a first power consumption ratio of the CPU and the GPU in performing the workload(s), and modifies operation of at least one of the CPU and the GPU to change the first power consumption ratio to a second power consumption ratio that is more power efficient than the first power consumption ratio. As such, the GPU may be operated at its highest performance level when needed to convert power for less demanding CPU workloads, thus conserving power consumed by the computing device in which both are located.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:
a computing device including:
a central processing system; and
at least one accelerator system; and
a central processor/accelerator power management system that is coupled to the computing device via a network, wherein the central processor/accelerator power management system is configured to:
deploy at least one workload on the computing device;
receive, from the computing device, workload performance information that identifies a current central processing system utilization of the central processing system in performing the at least one workload and a current accelerator system utilization of each at least one accelerator system in performing the at least one workload;
predict, using the workload performance information, a future central processing system utilization of the central processing system in performing the at least one workload and a future accelerator system utilization of each at least one accelerator system in performing the at least one workload;
determine, based on the future central processing system utilization of the central processing system in performing the at least one workload and the future accelerator system utilization of each at least one accelerator system in performing the at least one workload, a first power consumption ratio of the central processing system and the at least one accelerator system in performing the at least one workload; and
modify operation of at least one of the central processing system and the at least one accelerator system to change the first power consumption ratio to a second power consumption ratio that is more power efficient than the first power consumption ratio.

2. The system of claim 1, wherein the central processor/accelerator power management system is configured to:
provide a power cap for the computing device, wherein the first power consumption ratio is a first ratio of the use by the central processing system and the at least one accelerator system of the power cap, and wherein the second power consumption ratio is a second ratio of the use by the central processing system and the at least one accelerator system of the power cap.

3. The system of claim 1, wherein the central processor/accelerator power management system is configured to:
retrieve historical workload performance information associated with the central processing system and the at least one accelerator system; and
predict, using the workload performance information along with the historical workload performance information associated with the central processing system and the at least one accelerator system, the future central processing system utilization of the central processing system in performing the at least one workload and the future accelerator system utilization of each at least one accelerator system in performing the at least one workload.

4. The system of claim 1, wherein the workload performance information that identifies the current central processing system utilization of the central processing system in performing the at least one workload and the current accelerator system utilization of each at least one accelerator system in performing the at least one workload is received via telemetry data provided by the computing device.

5. The system of claim 1, wherein the modifying the operation of the at least one of the central processing system and the at least one accelerator system includes modifying a performance state of the at least one of the central processing system and the at least one accelerator system.

6. The system of claim 1, wherein the workload performance information identifies workload characteristics of the at least one workload performed by the central processing system and the at least one accelerator system.

7. An Information Handling System (IHS), comprising:
a processing system; and
a memory system that is coupled to the processing system and that includes instructions that, when executed by the processing system, cause the processing system to provide a central processor/accelerator power management engine that is configured to:
deploy at least one workload on a computing device;
receive, from the computing device, workload performance information that identifies a current central processing system utilization of a central processing system in the computing device that is performing the at least one workload and a current accelerator system utilization of each at least one accelerator system in the computing device that is performing the at least one workload;
predict, using the workload performance information, a future central processing system utilization of the central processing system in performing the at least one workload and a future accelerator system utilization of each at least one accelerator system in performing the at least one workload;
determine, based on the future central processing system utilization of the central processing system in performing the at least one workload and the future accelerator system utilization of each at least one accelerator system in performing the at least one workload, a first power consumption ratio of the central processing system and the at least one accelerator system in performing the at least one workload; and
modify operation of at least one of the central processing system and the at least one accelerator system to change the first power consumption ratio to a second power consumption ratio that is more power efficient than the first power consumption ratio.

8. The IHS of claim 7, wherein the central processor/accelerator power management engine is configured to:
provide a power cap for the computing device, wherein the first power consumption ratio is a first ratio of the use by the central processing system and the at least one accelerator system of the power cap, and wherein the second power consumption ratio is a second ratio of the use by the central processing system and the at least one accelerator system of the power cap.

9. The IHS of claim 7, wherein the central processor/accelerator power management system is configured to:

retrieve historical workload performance information associated with the central processing system and the at least one accelerator system; and predict, using the workload performance information along with the historical workload performance information associated with the central processing system and the at least one accelerator system, the future central processing system utilization of the central processing system in performing the at least one workload and the future accelerator system utilization of each at least one accelerator system in performing the at least one workload.

10. The IHS of claim 7, wherein the workload performance information that identifies the current central processing system utilization of the central processing system in performing the at least one workload and the current accelerator system utilization of each at least one accelerator system in performing the at least one workload is received via telemetry data provided by the computing device.

11. The IHS of claim 7, wherein the modifying the operation of the at least one of the central processing system and the at least one accelerator system includes modifying a performance state of the at least one of the central processing system and the at least one accelerator system.

12. The IHS of claim 7, wherein the workload performance information identifies workload characteristics of the at least one workload performed by the central processing system and the at least one accelerator system.

13. The IHS of claim 7, wherein the modifying the operation of the at least one of the central processing system and the at least one accelerator system includes increasing utilization of the at least one accelerator system and decreasing central processing system a utilization of the central processing system.

14. A method for managing power for a central processing system and at least one accelerator system, comprising:

deploying, by a central processor/accelerator power management system, at least one workload on a computing device;

receiving, by the central processor/accelerator power management system from the computing device, workload performance information that identifies a current central processing system utilization of a central processing system in the computing device that is performing the at least one workload and a current accelerator system utilization of each at least one accelerator system in the computing device that is performing the at least one workload;

predicting, by the central processor/accelerator power management system using the workload performance information, a future central processing system utilization of the central processing system in performing the at least one workload and a future accelerator system utilization of each at least one accelerator system in performing the at least one workload;

determining, by the central processor/accelerator power management system based on the future central processing system utilization of the central processing system in performing the at least one workload and the future accelerator system utilization of each at least one accelerator system in performing the at least one workload, a first power consumption ratio of the central processing system and the at least one accelerator system in performing the at least one workload; and modifying, by the central processor/accelerator power management system, operation of at least one of the central processing system and the at least one accelerator system to change the first power consumption ratio to a second power consumption ratio that is more power efficient than the first power consumption ratio.

15. The method of claim 14, further comprising:

providing, by the central processor/accelerator power management system, a power cap for the computing device, wherein the first power consumption ratio is a first ratio of the use by the central processing system and the at least one accelerator system of the power cap, and wherein the second power consumption ratio is a second ratio of the use by the central processing system and the at least one accelerator system of the power cap.

16. The method of claim 14, further comprising:

retrieving, by the central processor/accelerator power management system, historical workload performance information associated with the central processing system and the at least one accelerator system; and predicting, by the central processor/accelerator power management system using the workload performance information along with the historical workload performance information associated with the central processing system and the at least one accelerator system, the future central processing system utilization of the central processing system in performing the at least one workload and the future accelerator system utilization of each at least one accelerator system in performing the at least one workload.

17. The method of claim 14, wherein the workload performance information that identifies the current central processing system utilization of the central processing system in performing the at least one workload and the current accelerator system utilization of each at least one accelerator system in performing the at least one workload is received via telemetry data provided by the computing device.

18. The method of claim 14, wherein the modifying the operation of the at least one of the central processing system and the at least one accelerator system includes modifying a performance state of the at least one of the central processing system and the at least one accelerator system.

19. The method of claim 14, wherein the workload performance information identifies workload characteristics of the at least one workload performed by the central processing system and the at least one accelerator system.

20. The method of claim 14, wherein the modifying the operation of the at least one of the central processing system and the at least one accelerator system includes increasing a utilization of the at least one accelerator system and decreasing a utilization of the central processing system.

* * * * *

UNITED STATES PATENT AND TRADEMARK OFFICE
CERTIFICATE OF CORRECTION

PATENT NO. : 11,747,882 B2
APPLICATION NO. : 17/510726
DATED : September 5, 2023
INVENTOR(S) : Mukherjee et al.

It is certified that error appears in the above-identified patent and that said Letters Patent is hereby corrected as shown below:

In the Claims

Column 19, Lines 29-34, Claim 13, should read as follows:
--The IHS of claim 7, wherein the modifying the operation of the at least one of the central processing system and the at least one accelerator system includes increasing a utilization of the at least one accelerator system and decreasing a utilization of the central processing system.--

Signed and Sealed this
Twenty-first Day of November, 2023

Katherine Kelly Vidal
*Director of the United States Patent and Trademark Office*